US011240753B2

(12) United States Patent
Guo et al.

(10) Patent No.: US 11,240,753 B2
(45) Date of Patent: Feb. 1, 2022

(54) METHOD AND APPARATUS FOR BEAM MANAGEMENT IN A WIRELESS COMMUNICATION SYSTEM

(71) Applicant: ASUSTek Computer Inc., Taipei (TW)

(72) Inventors: Yu-Hsuan Guo, Taipei (TW); Hsin-Hsi Tsai, Taipei (TW); Richard Lee-Chee Kuo, Taipei (TW); Meng-Hui Ou, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 15/822,017

(22) Filed: Nov. 24, 2017

(65) Prior Publication Data

US 2018/0167883 A1 Jun. 14, 2018

Related U.S. Application Data

(60) Provisional application No. 62/433,444, filed on Dec. 13, 2016.

(51) Int. Cl.
*H04W 76/28* (2018.01)
*H04W 52/02* (2009.01)
(Continued)

(52) U.S. Cl.
CPC ...... *H04W 52/0216* (2013.01); *H04B 7/0617* (2013.01); *H04B 7/0695* (2013.01); *H04B 7/088* (2013.01); *H04W 72/02* (2013.01); *H04W 72/046* (2013.01); *H04W 76/27* (2018.02); *H04W 16/28* (2013.01);
(Continued)

(58) Field of Classification Search
CPC ............. H04W 52/0216; H04W 76/27; H04W 72/046; H04W 72/02; H04W 16/28; H04W 76/28; H04W 72/0446; H04W 74/004; H04B 7/088; H04B 7/0695; H04B 7/0617; Y02D 70/1262; Y02D 70/24; Y02D 70/20; Y02D 70/00; Y02D 70/146; Y02D 70/21;
(Continued)

(56) References Cited

U.S. PATENT DOCUMENTS 8,606,336 B2 12/2013 Womack et al.
9,565,631 B2 2/2017 Wittberg et al.
(Continued)

FOREIGN PATENT DOCUMENTS

CN 106162673 A 11/2016
EP 3264631 1/2013
(Continued)

OTHER PUBLICATIONS

Agiwal et al., "SYstem & Method Connected Mode Discontinuous Operation in Beam-formed System", U.S. Appl. No. 62/357,604, filed Jul. 1, 2016 (Year: 2016).*
(Continued)

*Primary Examiner* — Thinh D Tran
(74) *Attorney, Agent, or Firm* — Cooper Legal Group, LLC

(57) ABSTRACT

A method and apparatus are disclosed from the perspective of a UE. In one embodiment, the method includes receiving a configuration, wherein the configuration indicates whether the UE performs a beam management during a specific period of time. The method also includes determining whether to perform the beam management during the specific period of time based on at least the configuration.

14 Claims, 31 Drawing Sheets

(51) Int. Cl.
  *H04W 72/04* (2009.01)
  *H04W 72/02* (2009.01)
  *H04W 76/27* (2018.01)
  *H04B 7/08* (2006.01)
  *H04B 7/06* (2006.01)
  *H04W 74/00* (2009.01)
  *H04W 16/28* (2009.01)

(52) U.S. Cl.
  CPC ...... *H04W 72/0446* (2013.01); *H04W 74/004* (2013.01); *H04W 76/28* (2018.02); *Y02D 30/70* (2020.08)

(58) Field of Classification Search
  CPC ............... Y02D 70/1226; Y02D 70/23; Y02D 70/1264; Y02D 70/444
  See application file for complete search history.

(56) References Cited

U.S. PATENT DOCUMENTS

| | | | |
|---|---|---|---|
| 2006/0264184 | A1 | 11/2006 | Li |
| 2013/0064195 | A1 | 3/2013 | Chang et al. |
| 2013/0242833 | A1* | 9/2013 | Ahn ...................... H04W 76/28 370/311 |
| 2015/0078189 | A1 | 3/2015 | Kwon |
| 2016/0072568 | A1 | 3/2016 | Mun |
| 2016/0192433 | A1* | 6/2016 | Deenoo ............... H04W 72/046 370/329 |
| 2016/0219570 | A1 | 7/2016 | Guo |
| 2017/0207843 | A1* | 7/2017 | Jung ..................... H04B 7/0408 |
| 2017/0251518 | A1* | 8/2017 | Agiwal ................. H04W 24/08 |
| 2018/0063883 | A1* | 3/2018 | Nagaraja ............... H04W 76/28 |
| 2019/0081751 | A1* | 3/2019 | Miao .................. H04W 72/0406 |

FOREIGN PATENT DOCUMENTS

| | | |
|---|---|---|
| KR | 2015-0031584 | 3/2015 |
| WO | 2014106539 | 7/2014 |
| WO | 2016115711 | 7/2016 |
| WO | 2016155776 | 10/2016 |

OTHER PUBLICATIONS

Nagaraja et al., "Beam Training for Discontinuous reception (DRX) mode operation", U.S. Appl. No. 62/380,306, filed Aug. 26, 2016 (Year: 2016).*
Nokia, Alcatel-lucent Shanghai Bell, "DRX and Beam Management", 3GPP TSG-RAN WG1 #86bis, R1-1610405, Document for Discussion and Decision, Agenda Item 8.1.4.1, Lisbon, Portugal, Oct. 10-14, 2016, pp. 1-3. (Year: 2016).*
Samsung, "NR Connected DRX Operation with Beamforming", 3GPP TSG-RAN WG2 #96, R2-168816, Nov. 14-18, 2016. (Year: 2016).*
Office Action in the corresponding JP Patent Application No. 106141059, dated Jun. 25, 2018.
3GPP TSG-RAN WG2 Meeting #96, R2-167875, Nov. 4, 2016.
Notice of Submission of Opinion office action from Korean intellectual Property Office in corresponding KR Application No. 10-2017-0158875, dated Dec. 18, 2018.
Office Action from Japan Patent Office in corresponding JP Application No. 2017-225322, dated Dec. 11, 2018.
3GPP TSG-RAN WG2 Meeting #96, Reno, USA, Nov. 14-18, 2016, T-doc R2-168816.
3GPP TSG RAN WG1 #87, Reno, USA, Nov. 14-18, 2016, T-doc R1-1612189.
3GPP TSG RAN WG1-Meeting #87, Reno, Nevada, USA, Nov. 14-18, 2016, Tdo R1-1612059.
3GPP TSG-RAN WG2 Meeting #96, R2-168567, Nov. 5, 2016.
Office Action from Korean Intellectual Property Office in corresponding KR Application No. 10-2017-0158875, dated Jun. 21, 2019.
Corresponding Japanese Patent Application No. 2019-156276, Office Action dated Oct. 27, 2020. English Translation.
Nokia, Alcatel-lucent Shanghai Bell, "DRX and Beam Management", 3GPP TSG-RAN WG1 #86bis, R1-1610405, Document for Discussion and Decision, Agenda Item 8.1.4.1, Lisbon, Portugal, Oct. 10-14, 2016, pp. 1-3.
Huawei Hisilicon: "UE power saving mechanism in High Frequency", 3GPP Draft; R2-167875, 3rd Generation Partnership Project (3GPP), Mobile Competence Centre; 650, Route Des Lucioles; F-06921 Sophia-Antipolis Cedex: France vol. RAN WG2, No. Reno, Nevada, USA; Nov. 14, 2016-Nov. 18, 2016 Nov. 13, 2016 (Nov. 13, 2016), XP051177620.
National Taiwan University: "Discussion on Power Saving for HF NR", 3GPP Draft; R2-168850, 3rd Generation Partnership Project (3GPP), Mobile Competence Centre; 650, Route Des Lucioles; F-06921 Sophia-Antipolis Cedex: France vol. RAN WG2, No. Reno, USA; Nov. 14, 2016-Nov. 18, 2016 Nov. 14, 2016 (Nov. 14, 2016), XP051178415.
Nokia Alcatel-Lucent Shanghai Bell: "DRX and Beam management", 3GPP Draft; R1-1612869, 3rd Generation Partnership Project (3GPP), Mobile Competence Centre; 650, Route Des Lucioles; F-06921 Sophia-Antipolis Cedex; France vol. RAN WG1, No. Reno, U.S.A.; Nov. 14, 2016-Nov. 18, 2016 Nov. 13, 2016 (Nov. 13, 2016), XP051176810.
European Search Report from corresponding EP Application No. 17203456.3, dated Apr. 30, 2018.

* cited by examiner

| Value of BRRS resource allocation field | Description | |
|---|---|---|
| | Subframe type allocation | Symbol type allocation |
| '00' | 5 symbols in slot 0 | 13th symbol |
| '01' | 5 symbols in slot 1 | 14th symbol |
| '10' | 10 symbols | 13 & 14th symbols |
| '11' | Reserved | Reserved |

FIG. 8

| Value of BRRS process indication field | Description |
|---|---|
| '00' | The first BR process configured by the higher layers |
| '01' | The second BR process configured by the higher layers |
| '10' | The third BR process configured by the higher layers |
| '11' | The fourth BR process configured by the higher layers |

FIG. 9 (PRIOR ART)

| | Description | Bit length |
|---|---|---|
| BRRS resource ID 0, BRRS resource ID 1, ..., BRRS resource ID 7 | Antenna Ports to be measured for each BRRS resource (up to 8 ports) (8 bit bitmap for ports 600 to 607). | 8*8=64bits |
| Resource allocation type | 0 : subframe type allocation<br>1 : symbol type allocation | 1 bits |
| VCID | Virtual cell ID | 9 bits |

FIG. 10 (PRIOR ART)

| BRSRP index | Measured quantity value [dBm] |
|---|---|
| 0 | BRSRP < -140 |
| 1 | -140 ≤ BRSRP < -139 |
| 2 | -139 ≤ BRSRP < -138 |
| ... | ... |
| 95 | -46 ≤ BRSRP < -45 |
| 96 | -45 ≤ BRSRP < -44 |
| 97 | -44 ≤ BRSRP |

FIG. 11 (PRIOR ART)

| Reported value | Measured quantity value | Unit |
|---|---|---|
| 0 | BRRS-RP < -140 | dBm |
| 1 | -140 ≤ BRRS-RP < -139 | dBm |
| 2 | -139 ≤ BRRS-RP < -138 | dBm |
| ... | ... | ... |
| 95 | -46 ≤ BRRS-RP < -45 | dBm |
| 96 | -45 ≤ BRRS-RP < -44 | dBm |
| 97 | -44 ≤ BRRS-RP | dBm |

FIG. 12 (PRIOR ART)

| BRRS-RI | BRRS resource ID |
|---------|------------------|
| 0 | 0 |
| 1 | 1 |
| 2 | 2 |
| 3 | 3 |
| 4 | 4 |
| 5 | 5 |
| 6 | 6 |
| 7 | 7 |

FIG. 13 (PRIOR ART)

METHOD AND APPARATUS FOR BEAM MANAGEMENT IN A WIRELESS COMMUNICATION SYSTEM

CROSS-REFERENCE TO RELATED APPLICATIONS

The present Application claims the benefit of U.S. Provisional Patent Application Ser. No. 62/433,444 filed on Dec. 13, 2016, the entire disclosure of which is incorporated herein in its entirety by reference.

FIELD

This disclosure generally relates to wireless communication networks, and more particularly, to a method and apparatus for beam management in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a UE (User Equipment). In one embodiment, the method includes receiving a configuration, wherein the configuration indicates whether the UE performs a beam management during a specific period of time. The method also includes determining whether to perform the beam management during the specific period of time based on at least the configuration.

BRIEF DESCRIPTION OF THE DRAWINGS

FIG. 8 is a reproduction of Table 5.2-1 of TS 5G.213 v1.9.

FIG. 9 is a reproduction of Table 5.2-2 of TS 5G.213 v1.9.

FIG. 10 is a reproduction of Table 5.2-3 of TS 5G.213 v1.9.

FIG. 11 is a reproduction of Table 8.3.3.1-1 of TS 5G.213 v1.9.

FIG. 12 is a reproduction of Table 8.4.3.1-1 of TS 5G.213 v1.9.

FIG. 13 is a reproduction of Table 8.4.3.2-1 of TS 5G.213 v1.9.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including: R2-162366, "Beam Forming Impacts", Nokia and Alcatel-Lucent; R2-163716, "Discussion on terminology of beamforming based high frequency NR", Samsung; R2-162709, "Beam support in NR", Intel; R2-162762, "Active Mode Mobility in NR: SINR drops in higher frequencies", Ericsson; R3-160947, TR 38.801 V0.1.0, "Study on New Radio Access Technology; Radio Access Architecture and Interfaces"; R2-164306, "Summary of email discussion [93bis #23][NR] Deployment scenarios", NTT DOCOMO; 3GPP RAN2 #94 meeting minute; R2-163879, "RAN2 Impacts in HF-NR", MediaTeK; R2-162210, "Beam level management <-> Cell level mobility", Samsung; R2-163471, "Cell concept in NR", CATT; R2-164270, "General considerations on LTE-NR tight interworking", Huawei; R2-162251, "RAN2 aspects of high frequency New RAT", Samsung; R1-165364, "Support for Beam Based Common Control Plane", Nokia and Alcatel-Lucent Shanghai Bell; TS 36.321 V13.2.0, "Medium Access Control (MAC) protocol specification"; TS 36.300 v13.4.0, "E-UTRA and E-UTRAN; Overall description; Stage 2"; TS 36.213 v13.2.0, "E-UTRA; Physical layer procedures"; and R2-168856, "Text Proposal to TR 38.804 on UE states and state transitions for NR", NTT DoCoMo.

Furthermore, the exemplary wireless communication systems devices described below may be designed to the wireless technology discussed in the various documents, including: TS 5G.211 v2.6, "KT 5G Physical channels and modulation (Release 1)"; TS 5G.212 v2.3, "KT 5G Physical Layer Multiplexing and channel coding (Release 1)"; TS 5G.213 v1.9, "KT 5G Physical layer procedures (Release 1)"; and TS 5G.321 v1.2, "KT 5G MAC protocol specification (Release 1)".

The standards and documents listed above are hereby expressly incorporated by reference in their entirety.

Figure 1:
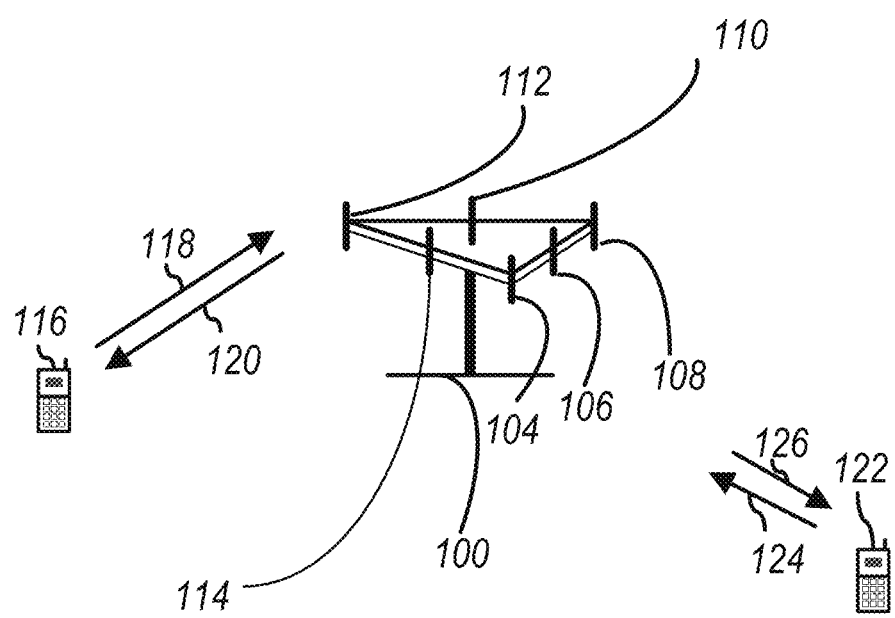
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
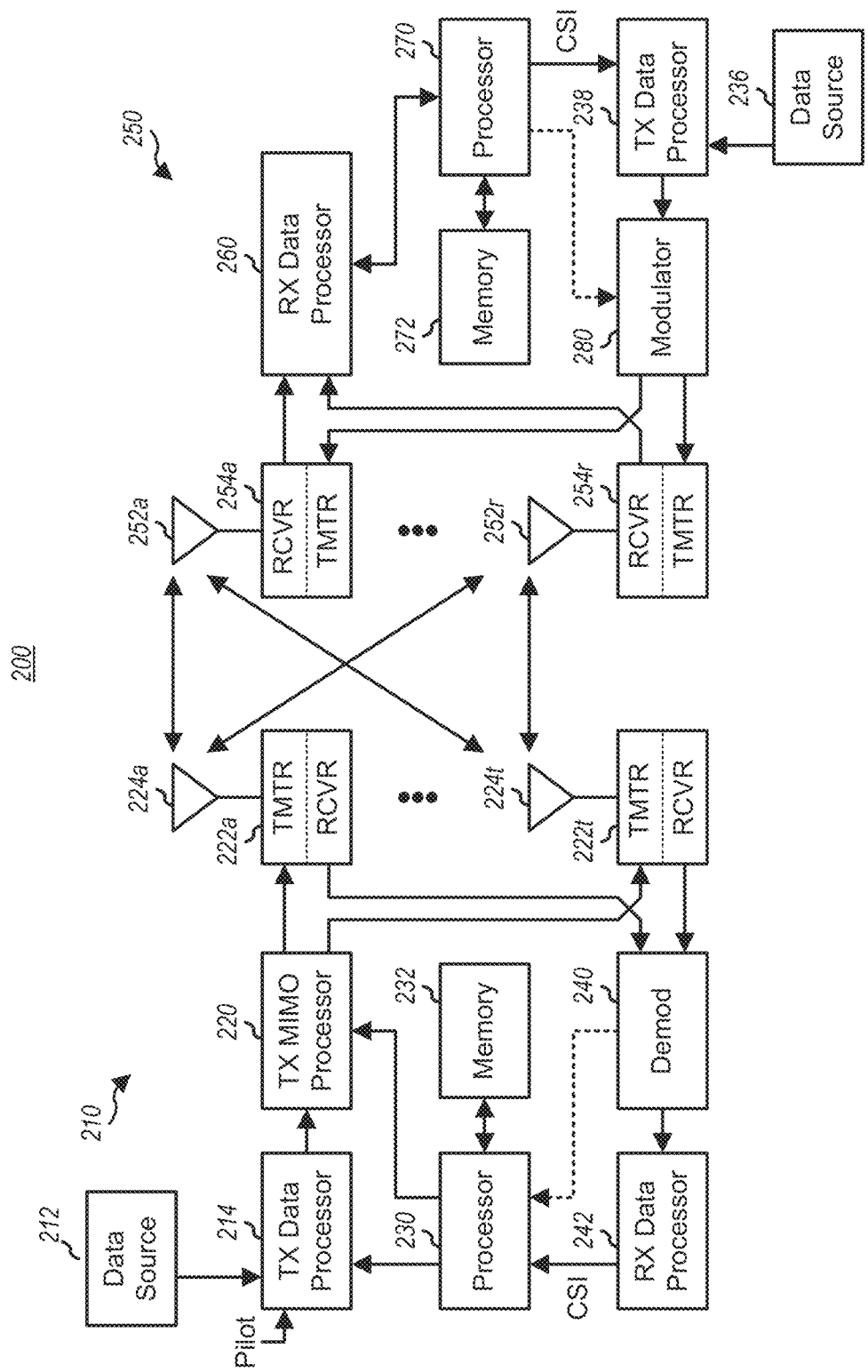
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
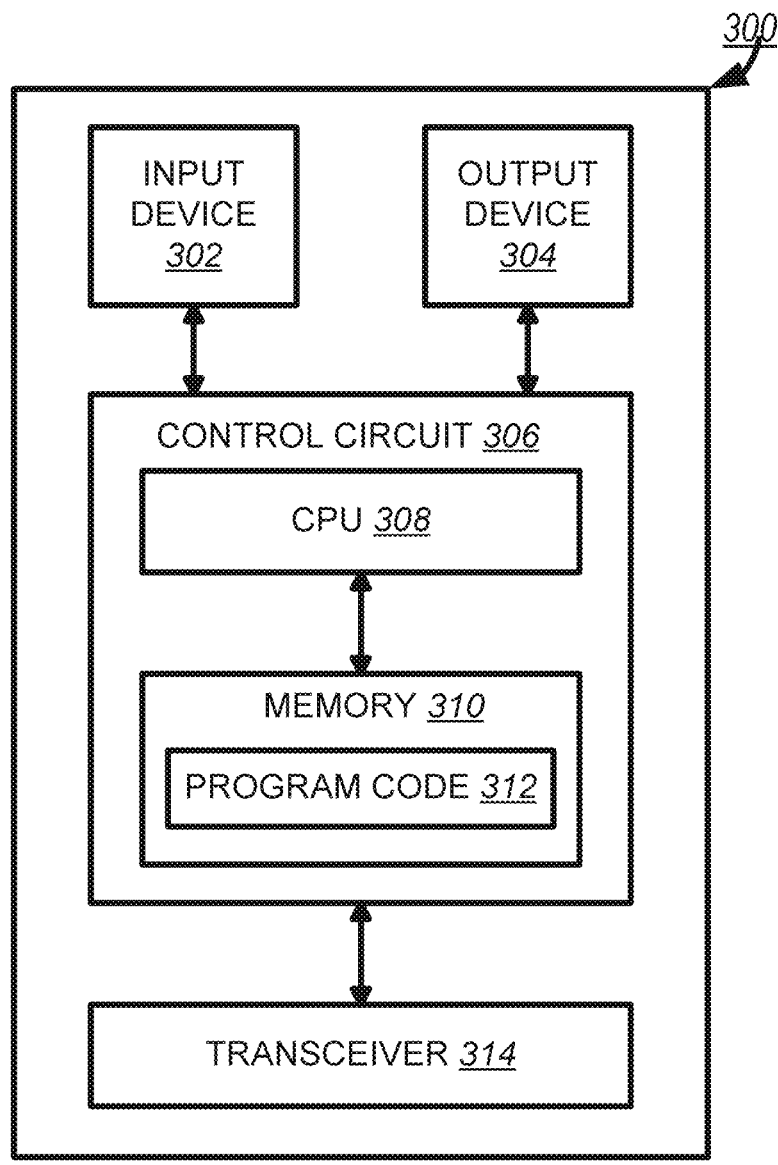
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
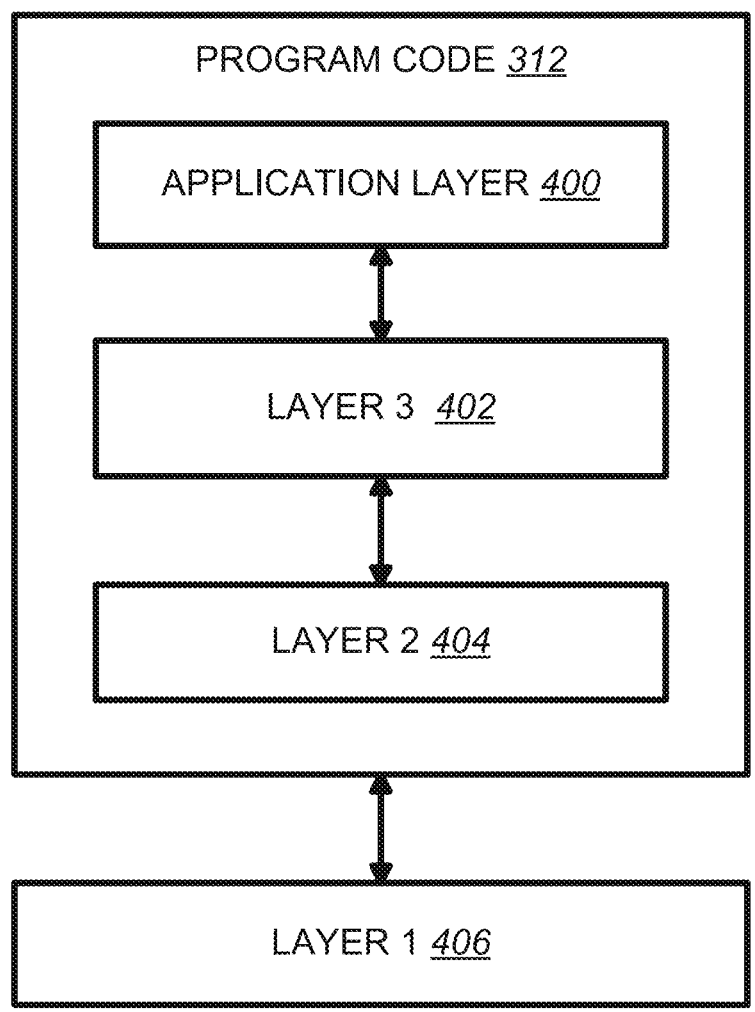
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP standardization activities on next generation (i.e., 5G) access technology have been launched since March 2015. The next generation access technology aims to support the following three families of usage scenarios for satisfying both the urgent market needs and the more long-term requirements set forth by the ITU-R IMT-2020:
  eMBB (enhanced Mobile Broadband);
  mMTC (massive Machine Type Communications); and
  URLLC (Ultra-Reliable and Low Latency Communications).

In general, an objective of the 5G study item on new radio access technology is to identify and develop technology components needed for new radio systems which could use any spectrum band ranging at least up to 100 GHz. Supporting carrier frequencies up to 100 GHz brings a number of challenges in the area of radio propagation. As the carrier frequency increases, the path loss also increases.

Based on 3GPP R2-162366, in lower frequency bands (e.g., current LTE bands<6 GHz) the required cell coverage may be provided by forming a wide sector beam for transmitting downlink common channels. However, utilizing wide sector beam on higher frequencies (>>6 GHz) the cell coverage is reduced with same antenna gain. Thus, in order to provide required cell coverage on higher frequency bands, higher antenna gain is needed to compensate the increased path loss. To increase the antenna gain over a wide sector beam, larger antenna arrays (with number of antenna elements ranging from tens to hundreds) are used to form high gain beams.

As a consequence, the high gain beams are narrow compared to a wide sector beam so multiple beams for transmitting downlink common channels are needed to cover the required cell area. The number of concurrent high gain beams that an access point is able to form may be limited by the cost and complexity of the utilized transceiver architecture. In practice, on higher frequencies, the number of concurrent high gain beams is much less than the total number of beams required to cover the cell area. In other words, the access point is able to cover only part of the cell area by using a subset of beams at any given time.

As discussed in 3GPP R2-163716, beamforming is a signal processing technique used in antenna arrays for directional signal transmission/reception. With beamforming, a beam can be formed by combining elements in a phased array of antennas in such a way that signals at particular angles experience constructive interference while others experience destructive interference. Different beams can be utilized simultaneously using multiple arrays of antennas.

Figure 5:
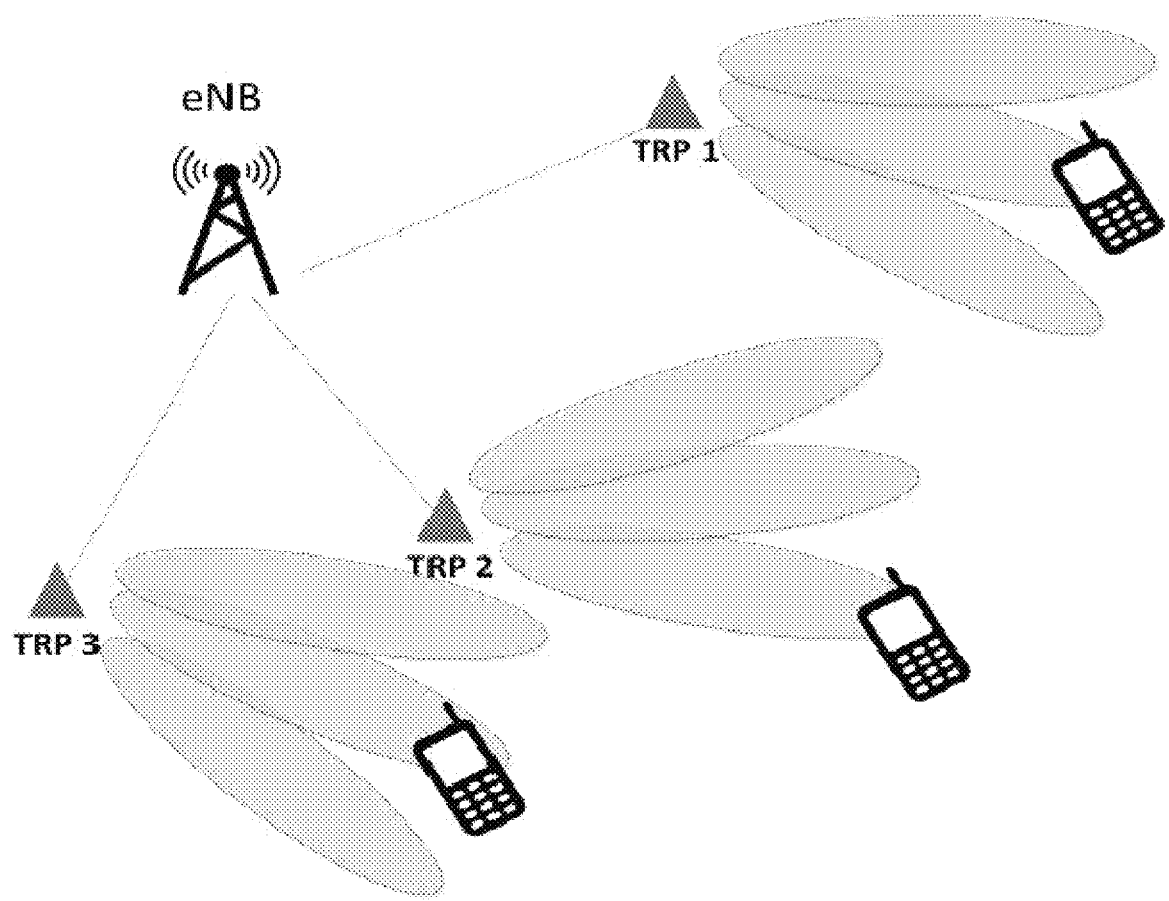
FIG. 5 is a reproduction of FIG. 1 of 3GPP R2-162709.

As discussed in 3GPP R2-162709 and as shown in FIG. 5 (which is a reproduction of FIG. 1 of 3GPP R2-162709), an eNB (evolved Node B) may have multiple TRPs (either centralized or distributed). Each TRP (Transmission/Reception Point) can form multiple beams. The number of beams and the number of simultaneous beams in the time/frequency domain depend on the number of antenna array elements and the RF (Radio Frequency) at the TRP.

Potential mobility types for NR (New Radio) can be listed as follows:
  Intra-TRP mobility
  Inter-TRP mobility
  Inter-NR eNB mobility As discussed in R2-162762, reliability of a system purely relying on beamforming and operating in higher frequencies might be challenging, since the coverage might be more sensitive to both time and space variations. As a consequence, the SINR (Signal to Interference Plus Noise Ratio) of the narrow link can drop much quicker than in the case of LTE.

Using antenna arrays at access nodes with the number of elements in the hundreds, fairly regular grid-of-beams coverage patterns with tens or hundreds of candidate beams per node may be created. The coverage area of an individual beam from such array may be small, down to the order of some tens of meters in width. As a consequence, channel quality degradation outside the current serving beam area is quicker than in the case of wide area coverage, as provided by LTE.

As discussed in 3GPP TS 36.300, in LTE, the random access procedure is performed for the following events related to the Pcell (Primary Cell):
  Initial access from RRC_IDLE;
  RRC Connection Re-establishment procedure;
  Handover;

DL data arrival during RRC_CONNECTED requiring random access procedure:
  E.g., when UL synchronisation status is "non-synchronised".
UL data arrival during RRC_CONNECTED requiring random access procedure:
  E.g., when UL synchronisation status is "non-synchronised" or there are no PUCCH resources for SR available.
For positioning purpose during RRC_CONNECTED requiring random access procedure;
  E.g., when timing advance is needed for UE positioning.

The random access procedure is also performed on a SCell (Secondary Cell) to establish time alignment for the corresponding sTAG (Secondary TAG). Furthermore, the random access procedure takes two distinct forms:
  Contention based (applicable to first five events);
  Non-contention based (applicable to only handover, DL data arrival, positioning and obtaining timing advance alignment for a sTAG).

Normal DL/UL (Downlink/Uplink) transmission can take place after the random access procedure.

Figure 6:
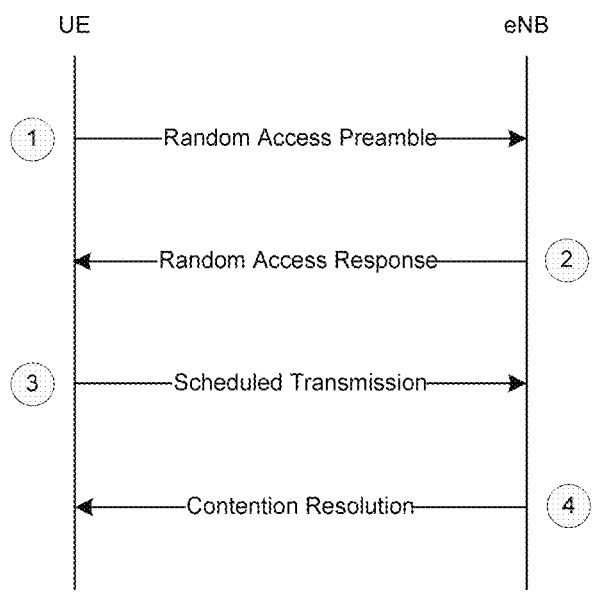
FIG. 6 illustrates the four steps of a contention based random access procedure according to one exemplary embodiment.

In LTE, two types of RA procedure are defined: contention-based and contention-free (Non-contention based). The four steps of a contention based random access procedure (as illustrated in FIG. 6) are:
  1) Random Access Preamble on RACH in uplink (Msg1):
    There are two possible groups defined and one is optional. If both groups are configured the size of message 3 and the pathloss are used to determine which group a preamble is selected from. The group to which a preamble belongs provides an indication of the size of the message 3 and the radio conditions at the UE. The preamble group information along with the necessary thresholds are broadcast on system information.
  2) Random Access Response generated by MAC on DL-SCH (Msg2):
    Semi-synchronous (within a flexible window of which the size is one or more TTI) with message 1;
    No HARQ;
    Addressed to RA-RNTI on PDCCH;
    Conveys at least RA-preamble identifier, Timing Alignment information for the pTAG, initial UL grant and assignment of Temporary C-RNTI (which may or may not be made permanent upon Contention Resolution);
    Intended for a variable number of UEs in one DL-SCH message.
  3) First scheduled UL transmission on UL-SCH (Msg3):
    Uses HARQ;
    Size of the transport blocks depends on the UL grant conveyed in step 2.
    For initial access:
      Conveys the RRC Connection Request generated by the RRC layer and transmitted via CCCH;
      Conveys at least NAS UE identifier but no NAS message;
      RLC TM: no segmentation.
    For RRC Connection Re-establishment procedure:
      Conveys the RRC Connection Re-establishment Request generated by the RRC layer and transmitted via CCCH;
      RLC TM: no segmentation;
      Does not contain any NAS message.
    After handover, in the target cell:
      Conveys the ciphered and integrity protected RRC Handover Confirm generated by the RRC layer and transmitted via DCCH;
      Conveys the C-RNTI of the UE (which was allocated via the Handover Command);
      Includes an uplink Buffer Status Report when possible.
    For other events:
      Conveys at least the C-RNTI of the UE.
  4) Contention Resolution on DL (Msg4):
    Early contention resolution shall be used i.e. eNB does not wait for NAS reply before resolving contention;
    Not synchronised with message 3;
    HARQ is supported;
    Addressed to:
      The Temporary C-RNTI on PDCCH for initial access and after radio link failure;
      The C-RNTI on PDCCH for UE in RRC_CONNECTED.
    HARQ feedback is transmitted only by the UE which detects its own UE identity, as provided in message 3, echoed in the Contention Resolution message;
    For initial access and RRC Connection Re-establishment procedure, no segmentation is used (RLC-TM).

A UE, which detects RA success and does not has a C-RNTI, promotes the Temporary C-RNTI to C-RNTI. A UE, which detects RA success and already has a C-RNTI, resumes using its C-RNTI and drops the Temporary C-RNTI.

Figure 7:
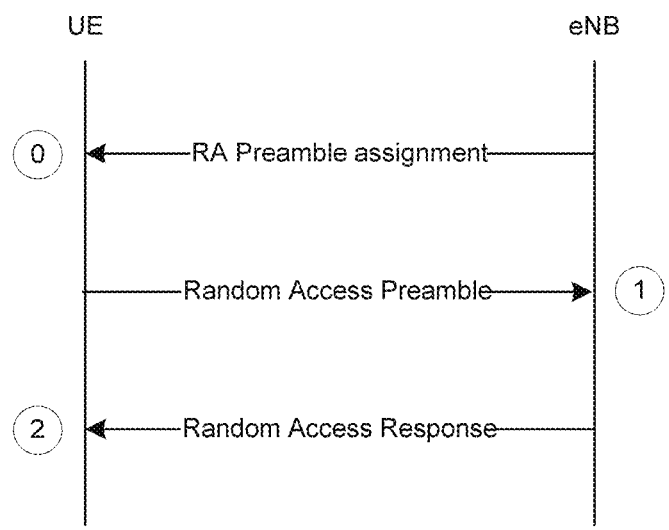
FIG. 7 shows the three steps of a non-contention based random access procedure according to one exemplary embodiment.

The three steps of a non-contention based random access procedure (as illustrated in FIG. 7) are:
  0) Random Access Preamble assignment via dedicated signalling in DL (Msg0):
    eNB assigns to UE a non-contention Random Access Preamble (a Random Access Preamble not within the set sent in broadcast signalling).
    Signalled via:
      HO command generated by target eNB and sent via source eNB for handover;
      PDCCH in case of DL data arrival or positioning;
      PDCCH for initial UL time alignment for a sTAG.
  1) Random Access Preamble on RACH in uplink (Msg1):
    UE transmits the assigned non-contention Random Access Preamble.
  2) Random Access Response on DL-SCH (Msg2):
    Semi-synchronous (within a flexible window of which the size is two or more TTIs) with message 1;
    No HARQ;
    Addressed to RA-RNTI on PDCCH;
    Conveys at least:
      Timing Alignment information and initial UL grant for handover;
      Timing Alignment information for DL data arrival;
      RA-preamble identifier;
      Intended for one or multiple UEs in one DL-SCH message.

DRX in LTE is described in 3GPP TS 36.321 as follows:
5.7 Discontinuous Reception (DRX)

The MAC entity may be configured by RRC with a DRX functionality that controls the UE's PDCCH monitoring activity for the MAC entity's C-RNTI, TPC-PUCCH-RNTI, TPC-PUSCH-RNTI, Semi-Persistent Scheduling C-RNTI (if configured), eIMTA-RNTI (if configured) and SL-RNTI (if configured). When in RRC_CONNECTED, if DRX is configured, the MAC entity is allowed to monitor the PDCCH discontinuously using the DRX operation specified in this subclause; otherwise the MAC entity monitors the PDCCH continuously. When using DRX operation, the MAC entity shall also monitor PDCCH according to requirements found in other subclauses of this specification. RRC controls DRX operation by configuring the timers onDurationTimer, drx-InactivityTimer, drx-Retransmission Timer (one per DL HARQ process except for the broadcast process), drx-ULRetransmissionTimer (one per asynchronous UL HARQ process), the longDRX-Cycle, the value of the drxStartOffset and optionally the drxShortCycleTimer and shortDRX-Cycle. A HARQ RTT timer per DL HARQ process (except for the broadcast process) and UL HARQ RTT Timer per asynchronous UL HARQ process is also defined (see subclause 7.7).

When a DRX cycle is configured, the Active Time includes the time while:
- onDurationTimer or drx-InactivityTimer or drx-Retransmission Timer or drx-ULRetransmission Timer or mac-ContentionResolutionTimer (as described in subclause 5.1.5) is running; or
- a Scheduling Request is sent on PUCCH and is pending (as described in subclause 5.4.4); or
- an uplink grant for a pending HARQ retransmission can occur and there is data in the corresponding HARQ buffer for synchronous HARQ process; or
- a PDCCH indicating a new transmission addressed to the C-RNTI of the MAC entity has not been received after successful reception of a Random Access Response for the preamble not selected by the MAC entity (as described in subclause 5.1.4).

When DRX is configured, the MAC entity shall for each subframe:
- if a HARQ RTT Timer expires in this subframe:
  - if the data of the corresponding HARQ process was not successfully decoded:
    - start the drx-RetransmissionTimer for the corresponding HARQ process;
    - if NB-IoT, start or restart the drx-InactivityTimer.
- if an UL HARQ RTT Timer expires in this subframe:
  - start the drx-ULRetransmissionTimer for the corresponding HARQ process.
  - if NB-IoT, start or restart the drx-InactivityTimer.
- if a DRX Command MAC control element or a Long DRX Command MAC control element is received:
  - stop onDurationTimer;
  - stop drx-InactivityTimer.
- if drx-InactivityTimer expires or a DRX Command MAC control element is received in this subframe:
  - if the Short DRX cycle is configured:
    - start or restart drxShortCycleTimer;
    - use the Short DRX Cycle.
  - else:
    - use the Long DRX cycle.
- if drxShortCycleTimer expires in this subframe:
  - use the Long DRX cycle.
- if a Long DRX Command MAC control element is received:
  - stop drxShortCycleTimer;
  - use the Long DRX cycle.
- If the Short DRX Cycle is used and [(SFN*10)+subframe number] modulo (shortDRX-Cycle)=(drxStartOffset) modulo (shortDRX-Cycle); or
- if the Long DRX Cycle is used and [(SFN*10)+subframe number] modulo (longDRX-Cycle)=drxStartOffset:
  - start onDurationTimer.
- during the Active Time, for a PDCCH-subframe, if the subframe is not required for uplink transmission for half-duplex FDD UE operation, and if the subframe is not a half-duplex guard subframe [7] and if the subframe is not part of a configured measurement gap and if the subframe is not part of a configured Sidelink Discovery Gap for Reception, and for NB-IoT if the subframe is not required for uplink transmission or downlink reception other than on PDCCH; or
- during the Active Time, for a subframe other than a PDCCH-subframe and for a UE capable of simultaneous reception and transmission in the aggregated cells, if the subframe is a downlink subframe indicated by a valid eIMTA L1 signalling for at least one serving cell not configured with schedulingCellId [8] and if the subframe is not part of a configured measurement gap and if the subframe is not part of a configured Sidelink Discovery Gap for Reception; or
- during the Active Time, for a subframe other than a PDCCH-subframe and for a UE not capable of simultaneous reception and transmission in the aggregated cells, if the subframe is a downlink subframe indicated by a valid eIMTA L1 signalling for the SpCell and if the subframe is not part of a configured measurement gap and if the subframe is not part of a configured Sidelink Discovery Gap for Reception:
  - monitor the PDCCH;
  - if the PDCCH indicates a DL transmission or if a DL assignment has been configured for this subframe:
    - if the UE is an NB-IoT UE, a BL UE or a UE in enhanced coverage:
      - start the HARQ RTT Timer for the corresponding HARQ process in the subframe containing the last repetition of the corresponding PDSCH reception;
    - else:
      - start the HARQ RTT Timer for the corresponding HARQ process;
    - stop the drx-Retransmission Timer for the corresponding HARQ process.
  - if the PDCCH indicates an UL transmission for an asynchronous HARQ process:
    - start the UL HARQ RTT Timer for the corresponding HARQ process in the subframe containing the last repetition of the corresponding PUSCH transmission;
    - stop the drx-ULRetransmissionTimer for the corresponding HARQ process.
  - if the PDCCH indicates a new transmission (DL, UL or SL):
    - except for NB-IoT, start or restart drx-InactivityTimer.
  - if the PDCCH indicates a transmission (DL, UL) for a NB-IoT UE:
    - stop drx-InactivityTimer, drx-ULRetransmissionTimer and onDurationTimer.
- in current subframe n, if the MAC entity would not be in Active Time considering grants/assignments/DRX Command MAC control elements/Long DRX Command MAC control elements received and Scheduling Request sent until and including subframe n−5 when evaluating all DRX Active Time conditions as specified in this subclause, type-0-triggered SRS [2] shall not be reported.
- if CQI masking (cqi-Mask) is setup by upper layers:
  - in current subframe n, if onDurationTimer would not be running considering grants/assignments/DRX Command MAC control elements/Long DRX Command MAC control elements received until and including subframe n−5 when evaluating all DRX Active Time conditions as specified in this subclause, CQI/PMI/RI/PTI/CRI on PUCCH shall not be reported.

else:

in current subframe n, if the MAC entity would not be in Active Time considering grants/assignments/DRX Command MAC control elements/Long DRX Command MAC control elements received and Scheduling Request sent until and including subframe n−5 when evaluating all DRX Active Time conditions as specified in this subclause, CQI/PMI/RI/PTI/CRI on PUCCH shall not be reported.

Regardless of whether the MAC entity is monitoring PDCCH or not, the MAC entity receives and transmits HARQ feedback and transmits type-1-triggered SRS [2] when such is expected.

NOTE: The same Active Time applies to all activated serving cell(s).

NOTE: In case of downlink spatial multiplexing, if a TB is received while the HARQ RTT Timer is running and the previous transmission of the same TB was received at least N subframes before the current subframe (where N corresponds to the HARQ RTT Timer), the MAC entity should process it and restart the HARQ RTT Timer.

NOTE: The BL UE and the UE in enhanced coverage waits until the last subframe of the configured MPDCCH search space before executing the next specified action.

Beamforming procedure in KT 5G PHY specification is described in TS 5G.213 as follows:

5 Beamforming Procedures 5.1 Beam Acquisition and Tracking

The downlink transmitting beams are acquired from beam reference signals. Up to 8 antenna ports are supported for beam reference signal (BRS). A UE tracks downlink transmitting beams through the periodic BRS measurements. The BRS transmission period is configured by a 2 bit indicator in xPBCH. The BRS transmission period is the necessary time to sweep the whole downlink beams transmitted via BRS.

The following BRS transmission periods are supported:

"00" Single slot (<5 ms): supportable for maximum 7 downlink transmitting beams per antenna port "01" Single subframe (=5 m): supportable for maximum 14 downlink transmitting beams per antenna port "10" Two subframe (=10 ms): supportable for maximum 28 downlink transmitting beams per antenna port "11" Four subframe (=20 ms): supportable for maximum 56 downlink transmitting beams per antenna port UE maintains a candidate beam set of 4 BRS beams, where for each beam the UE records beam state information (BSI). BSI comprises beam index (BI) and beam reference signal received power (BRSRP).

UE reports BSI on PUCCH or PUSCH as indicated by 5G Node per clause 8.3. 5GNode may send BSI request in DL DCI, UL DCI, and RAR grant.

When reporting BSI on xPUCCH, UE reports BSI for a beam with the highest BRSRP in the candidate beam set.

When reporting BSI on xPUSCH, UE reports BSIs for N∈{1,2,4} beams in the candidate beam set, where N is provided in the 2-bit BSI request from 5G Node. The BSI reports are sorted in decreasing order of BRSRP.

5.1.1 BRS Management

There are two beam switch procedures, which are MAC-CE based beam switch procedure and DCI based beam switch procedure associated with BRS.

For the MAC-CE based beam switch procedure [4], 5G Node transmits a MAC-CE containing a BI to the UE.

The UE shall, upon receiving the MAC-CE, switch the serving beam at the UE to match the beam indicated by the MAC-CE. The beam switching shall apply from the beginning of subframe n+kbeamswitch-delay-mac where subframe n is used for HARQ-ACK transmission associated with the MAC-CE and kbeamswitch-delay-mac=14. The UE shall assume that the 5G Node beam associated with xPDCCH, xPDSCH, CSI-RS, xPUCCH, xPUSCH, and xSRS is switched to the beam indicated by the MAC-CE from the beginning of subframe n+kbeam-switch-delay-mac.

For the DCI based beam switch procedure, 5G Node requests a BSI report via DCI and the beam_switch_indication field is set to 1 in the same DCI. The UE shall, upon receiving such a DCI, switch the serving beam at the UE to match the beam indicated by the first BI reported by the UE in the BSI report corresponding to this BSI request. The beam switching shall apply from the beginning of subframe n+kbeam-switch-delay-dic where subframe n is used for sending the BSI report and kbeam-switch-delay-dci=11.

If beam_switch_indication field=0 in the DCI the UE is not required to switch the serving beam at the UE.

For any given subframe, if there is a conflict in selecting the serving beam at the UE, the serving beam is chosen that is associated with the most recently received subframe containing the MAC-CE (for MAC-CE based procedure) or the DCI (for DCI based procedure). A UE is not expected to receive multiple requests for beam switching in the same subframe.

5.2 Beam Refinement

BRRS is triggered by DCI. A UE can also request BRRS using SR [4]. To request the serving 5G Node to transmit BRRS, the UE transmits the scheduling request preamble where the higher layer configured preamble resource {u,v,f, and NSR} is dedicated for beam refinement reference signal initiation request.

The time and frequency resources that can be used by the UE to report Beam Refinement Information (BRI), which consists of BRRS Resource Index (BRRS-RI) and BRRS reference power (BRRS-RP), are controlled by the 5G Node.

A UE can be configured with 4 Beam Refinement (BR) processes by higher layers. A 2-bit resource allocation field and a 2 bit process indication field in the DCI are described in Table 5.2-1 and Table 5.2-2, respectively.

Table 5.2-1 of TS 5G.213 v1.9, Entitled "BRRS Resource Allocation Field for xPDCCH with DL or UL DCI", is Reproduced as FIG. 8

Table 5.2-2 of TS 5G.213 v1.9, Entitled "BRRS Process Indication Field for xPDCCH with DL or UL DCI", is Reproduced as FIG. 9

A BR process comprises of up to eight BRRS resources, a resource allocation type and a VCID, and is configured via RRC signalling. A BRRS resource comprises of a set of antenna ports to be measured.

Table 5.2-3 of TS 5G.213 v1.9, Entitled "BR Process Configuration", is Reproduced as FIG. 10

A BRRS transmission can span 1, 2, 5 or 10 OFDM symbols, and is associated with a BRRS resource allocation, BRRS process indication, and a BR process configuration as in Table 5.2-1, 5.2.-2 and 5.2.-3. A BRI reported by the UE corresponds to one BR process that is associated with up to eight BRRS resources. The UE shall assume that BRRS mapped to the BRRS resource ID 0 in each BRRS process is transmitted by the serving beam.

5.2.1 BRRS Management

There are two beam switch procedures, which are MAC-CE based beam switch procedure and DCI based beam switch procedure associated with BRRS.

For the MAC-CE based beam switch procedure [4], 5G Node transmits a MAC-CE containing a BRRS resource ID and the associated BR process ID to the UE.

The UE shall, upon receiving the MAC-CE, switch the serving beam at the UE to match the beam indicated by the MAC-CE. The beam switching shall apply from the beginning of subframe n+kbeamswitch-delay-mac where subframe n is used for HARQ-ACK transmission associated with the MAC-CE and kbeamswitch-delay-mac=14. The UE shall assume that the 5G Node beam associated with xPDCCH, xPDSCH, CSI-RS, xPUCCH, xPUSCH, and xSRS is switched to the beam indicated by the MAC-CE from the beginning of subframe n+kbeam-switch-delay-mac.

For the DCI based beam switch procedure, 5G Node requests a BRI report via DCI and the beam_switch_indication field is set to 1 in the same DCI. The UE shall, upon receiving such a DCI, switch the serving beam at the UE to match the beam indicated by the first BRRS-RI reported by the UE in the BRI report corresponding to this BRI request. The beam switching shall apply from the beginning of subframe n+kbeam-switch-delay-dic where subframe n is used for sending the BRI report and kbeam-switch-delay-dci=11.

If beam_switch_indication field=0 in the DCI the UE is not required to switch the serving beam at the UE.

For any given subframe, if there is a conflict in selecting the serving beam at the UE, the serving beam is chosen that is associated with the most recently received subframe containing the MAC-CE (for MAC-CE based procedure) or the DCI (for DCI based procedure). A UE is not expected to receive multiple requests for beam switching in the same subframe.

5.3 Beam Recovery

If a UE detects the current serving beam is misaligned [4] and has BSIs for beam recovery, the UE shall perform beam recovery process.

In the UL synchronized UE case, the UE transmits scheduling request by scheduling request preamble where the preamble resource {u, v, f and $N_{SR}$} is dedicated for beam recovery as configured by higher layers. Upon the reception of this request, 5G Node may initiate BSI reporting procedure as described in section 8.3.

In UL asynchronized UE case, the UE transmits random access preamble for contention based random access. If the UE is scheduled by RAR triggering BSI reporting, the UE reports N BSIs in Msg3 as UCI multiplexing in [3].

[ . . . ]

8.3 UE Procedure for Reporting Beam State Information (BSI)

UE reports BSI on xPUCCH or xPUSCH as indicated by 5G Node. 5G Node can send BSI request in DL DCI, UL DCI, and RAR grant.

If a UE receives BSI request in DL DCI, the UE reports a BSI on xPUCCH. The time/frequency resource for xPUCCH is indicated in the DL DCI. When reporting BSI on xPUCCH, UE reports a BSI for a beam with the highest BRSRP in the candidate beam set.

If UE receives BSI request in UL DCI or in RAR grant, UE reports BSIs on xPUSCH. The time/frequency resource for xPUSCH is indicated in the UL DCI or RAR grant that requests BSI report. When reporting BSI on xPUSCH, UE reports BSI for $N \in \{1,2,4\}$ beams with the highest BRSRP in the candidate beam set, where N is provided in the DCI.

If BSI reporting is indicated on both xPUCCH and xPUSCH in the same subframe, UE reports BSI on xPUSCH only and discards the xPUCCH trigger.

8.3.1 BSI Reporting Using xPUSCH

Upon decoding in subframe n an UL DCI with a BSI request, UE shall report BSI using xPUSCH in subframe n+4+m+l, where parameters m=0 and l={0, 1, . . . 7} is indicated by the UL DCI.

The number of BSIs to report, $N \in \{1,2,4\}$, is indicated in UL DCI.

A UE shall report N BSIs corresponding to N beams in the candidate beam set.

A BSI report contains N BIs and corresponding BRSRPs. A UE shall report wideband BRSRPs.

A UE is not expected to receive more than one request for BSI reporting on xPUSCH for a given subframe.

8.3.2 BSI Reporting Using xPUCCH

Upon decoding in subframe n a DL DCI with a BSI request, UE shall report BSI using xPUCCH subframe index n+4+m+k, where parameters m=0 and k={0, 1, . . . 7} is indicated by the DL DCI.

When reporting BSI on xPUCCH, UE reports BSI for a beam with the highest BRSRP in the candidate beam set.

A BSI report contains BI and corresponding BRSRP. A UE shall report wideband BRSRP.

A UE is not expected to receive more than one request for BSI reporting on xPUCCH for a given subframe.

8.3.3 BSI Definition 8.3.3.1 BRSRP Definition

The BRSRP indices and their interpretations are given in Table 8.3.3.1-1. The reporting range of BRSRP is defined from −140 dBm to −44 dBm with 1 dB resolution as shown in Table 8.3.3.1-1.

The UE shall derive BRSRP values from the beam measurements based on BRS defined in 5G.211. The UE shall derive BRSRP index from the measured BRSRP value. Each BRSRP index is mapped to its corresponding binary representation using 7 bits.

Table 8.3.3.1-1 of TS 5G.213 v1.9, Entitled "7-Bit BRSRP Table", is Reproduced as FIG. 11

8.3.3.2 Beam Index Definition

BI indicates a selected beam index. The BI is the logical beam index associated with antenna port, OFDM symbol index and BRS transmission period [2], which is indicated by 9 bits.

8.4 UE Procedure for Reporting Beam Refinement Information (BRI)

8.4.1 BRI Reporting Using xPUSCH

If the uplink DCI in subframe n indicates a BRRS transmission, the BRRS is allocated in subframe n+m where m={0,1,2,3} is indicated by a 2 bit RS allocation timing in the DCI.

A BRI report is associated with one BR process that is indicated in the uplink DCI for the UE. Upon decoding in subframe n an UL DCI with a BRI request, the UE shall report BRI using xPUSCH in subframe n+4+m+l, where parameters m={0, 1, 2, 3} and l={0, 1, . . . 7} are indicated by the UL DCI.

A UE shall report wideband BRRS-RP values and BRRS-RI values corresponding to the best NBRRS BRRS resource ID where NBRRS is configured by higher layers If the number of configured BRRS resource ID associated with the BR process is less than or equal to NBRRS then the UE shall report BRRS-RP and BRRS-RI corresponding to all the configured BRRS resources.

A UE is not expected to receive more than one BRI report request for a given subframe.

8.4.2 BRI Reporting Using xPUCCH

If the DL DCI in subframe n indicates a BRRS transmission, the BRRS is allocated in subframe n+m where m={0, 1,2,3} is indicated by the DL DCI.

A BRI report is associated with one BRRS process that is indicated in the downlink DCI for the UE. Upon decoding in subframe n a DL DCI with a BRI request, the UE shall report BRI using xPUCCH in subframe n+4+m+k, where parameters m={0, 1, 2, 3} and k={0, 1, ... 7} are indicated by the DL DCI.

A UE shall report a wideband BRRS-RP value and a BRRS-RI value corresponding to the best BRRS resource ID.

A UE is not expected to receive more than one BRI report request for a given subframe.

8.4.3.1 BRRS-RP Definition

The reporting range of BRRS-RP is defined from −140 dBm to −44 dBm with 1 dB resolution.

The mapping of BRRS-RP to 7 bits is defined in Table 8.4.3.1-1. Each BRRS-RP index is mapped to its corresponding binary representation using 7 bits.

Table 8.4.3.1-1 of TS 5G.213 v1.9, Entitled "7-Bit BRRS-RP Table", is Reproduced as FIG. 12

8.4.3.2 BRRS-RI Definition

BRRS-RI indicates a selected BRRS resource ID. A BR process may comprise of a maximum of 8 BRRS resource IDs. The selected BRRS resource ID is indicated by 3 bits as in Table 8.4.3.2-1.

Table 8.4.3.2-1 of TS 5G.213 v1.9, Entitled "BRRS-RI Mapping", is Reproduced as FIG. 13

Beam management and DRX in KT 5G MAC specification are described in TS 5G.321 as follows:

5.5 Beam Management 5.5.1 Beam Feedback Procedure

The beam feedback procedure is used to report beam measurement results to the serving cell.

There are two beam feedback procedures defined one based on measurement of beam reference signal (BRS), beam state information reporting below, and one based on measurement of beam refinement reference signal (BRRS), beam refinement information reporting below.

5.5.1.1 Beam State Information Reporting

The BRS-based beam state information (BSI) reports initiated by xPDCCH order are transmitted through UCI on xPUCCH/xPUSCH as scheduled by the corresponding DCI [1]; event triggered BSI reports are transmitted through BSI Feedback MAC Control Element defined in subclause 6.1.3.11 using normal SR or contention-based RACH procedure, where BSI consists of Beam Index (BI) and beam reference signal received power (BRSRP). BSI reports are based on BRS transmitted by the serving cell.

5.5.1.1.1 BSI Reporting Initiated by xPDCCH Order

The BSI reports initiated by xPDCCH order are based on the latest measurement results obtained from the 5G physical layer.

if an xPDCCH order which requests BSI reporting through UCI via xPUCCH by serving cell is received in this TTI:
    if the serving beam is not the best beam and the BRSRP of the best beam is higher than BRSRP of the serving beam:
        instruct the 5G physical layer to signal the best beam on the scheduled UCI resource via xPUCCH as defined in [1];
    else:
        instruct the 5G physical layer to signal the serving beam on the scheduled UCI resource via xPUCCH as defined in [1];
if an xPDCCH order which requests BSI reporting through UCI via xPUSCH by serving cell is received in this TTI:
    if the number of BSI for reports requested equals to 1:
        if the serving beam is not the best beam and the BRSRP of the best beam is higher than BRSRP of the serving beam:
            instruct the 5G physical layer to signal the best beam on the scheduled UCI resource via xPUSCH as defined in [1];
        else:
            instruct the 5G physical layer to signal the serving beam on the scheduled UCI resource via xPUSCH as defined in [1];
    else if the number of BSI reports requested is higher than 1 and:
        if the serving beam is not the best beam and the BRSRP of the best beam is higher than BRSRP of the serving beam:
            instruct the 5G physical layer to signal N BSIs report with the best beam as the first BSI and the next N−1 highest BRSRP beam values on the scheduled UCI resource via xPUSCH;
        else:
            instruct the 5G physical layer to signal N BSIs report with the serving beam as the first BSI and the next N−1 highest BRSRP beam values on the scheduled UCI resource via xPUSCH;

5.5.1.1.2 BSI Reporting Initiated by 5G-MAC

The BSI reports initiated by 5G-MAC are based on an event trigger.

if the BRSRP of the best beam is higher than beamTriggeringRSRPoffset dB+the BRSRP of the serving beam and:
    if the UE is uplink synchronized (i.e., timeAlignmentTimer is not expired)
        UE transmits BSI Feedback MAC Control Element on the UL resource granted through normal SR procedure;
    else:
        UE transmits BSI Feedback MAC Control Element on the UL resource for Msg3 granted through contention-based random access procedure;

5.5.1.2 Beam Refinement Information Reporting

The beam refinement information (BRI) reports are initiated by xPDCCH order and reported through UCI on xPUCCH/xPUSCH are scheduled by the corresponding DCI [1] where BRI consists of a Refined Beam Index (RBI) and a BRSRP which are based on BRRS transmitted by the serving cell.

if an xPDCCH order which requests BRI report through UCI via xPUCCH by serving cell is received:
  instruct the 5G physical layer to signal BRI report on the scheduled UCI resource via xPUCCH, as defined in [1];
else if an xPDCCH order which requests BRI reporting through UCI via xPUSCH by serving cell is received:
  instruct the 5G physical layer to signal BRI report on the scheduled UCI resource via xPUSCH as defined in [1].
NOTE: event-triggered BRI feedback is not supported.
NOTE: BSI/BRI feedback requested by xPDCCH order do not affect on the 5G-MAC layer reporting procedures.

5.5.2 Beam Change Procedure

The beam change procedure is used by the serving cell to change the serving beam for the UE. The serving cell initiates the procedure by xPDCCH order, by BRS Beam Change Indication MAC Control Element, or by BRRS Beam Change Indication MAC Control Element.

For each TTI, the 5G-MAC entity shall:
  if the beam_change has been indicated by xPDCCH order for this TTI:
    if the previously transmitted report was a BRI report according to 5.5.1.2:
      instruct the 5G physical layer to change the serving beam to the beam corresponding to the RBI that had the highest BRSRP value reported after the time kbeamswitch-delay-dci defined in [1];
    else if the previously transmitted report was a BSI report according to 5.5.1.1:
      instruct the 5G physical layer to change the serving beam to the beam corresponding to the BI that had the highest BRSRP value reported after the time kbeamswitch-delay-dci defined in [1].
  if a BRS Beam Change Indication MAC Control Element as defined in 6.1.3.9 has been received in this TTI:
    instruct the 5G physical layer to change the serving beam to the beam corresponding to the BI explicitly signalled after the time kbeamswitch-delay-mac defined in [1].
  if a BRRS Beam Change Indication MAC Control Element as defined in 6.1.3.10 has been received in this TTI:
    instruct the 5G physical layer to change the serving beam to the beam corresponding to the RBI explicitly signalled after the time kbeamswitch-delay-mac defined in [1].

5.5.3 Beam Adjustment Request Procedure

If configured, the Beam Adjustment Request (BAR) is used to request the serving cell to transmit BRRS (Beam Refinement Reference Signal). UE measures the BRRS in the scheduled subframe(s) to determine the of the serving cell.

5G-RRC controls the BAR by configuring the timer prohibitBAR-Timer, which limits the interval between two consecutive BARs.

NOTE: UE can trigger BAR based on any UE implementation specific conditions.

A BAR shall be triggered if prohibitBAR-Timer is not running and any UE implementation specific condition is met.

If the BAR procedure determines that a BAR has been triggered:
  if the 5G-MAC entity has UL resources allocated for new transmission for this TTI
    instruct the Multiplexing and Assembly procedure to generate and transmit a BAR MAC control element as defined in 6.1.3.8
    start or restart the prohibitBAR-Timer
  else if a dedicated SR for BRRS Request is configured to the UE
    instruct the 5G physical layer to signal the dedicated SR for BRRS request in the 5G SR region of the RACH subframe
    start or restart the prohibitBAR-Timer
  else
    a Scheduling Request shall be triggered.

5.6 Discontinuous Reception (DRX)

The 5G-MAC entity may be configured by 5G-RRC with a DRX functionality that controls the UE's xPDCCH monitoring activity for the 5G-MAC entity's C-RNTI. When in 5G-RRC_CONNECTED, if DRX is configured, the 5G-MAC entity is allowed to monitor the xPDCCH discontinuously using the DRX operation specified in this subclause; otherwise the 5G-MAC entity monitors the xPDCCH continuously. When using DRX operation, the 5GMAC entity shall also monitor xPDCCH according to requirements found in other subclauses of this specification. 5GRRC controls DRX operation by configuring the timers onDurationTimer, drx-InactivityTimer, drx-Retransmission Timer (one per DL HARQ process except for the broadcast process), the longDRX-Cycle, the value of the drxStartOffset and optionally the drxShortCycleTimer and shortDRX-Cycle. A HARQ RTT timer per DL HARQ process (except for the broadcast process) is also defined.

When a DRX cycle is configured, the Active Time includes the time while:
  onDurationTimer or drx-InactivityTimer or drx-RetransmissionTimer or mac-ContentionResolutionTimer is running; or
  a Scheduling Request is sent on xPUCCH and is pending (as described in subclause 5.4.4); or
  an uplink grant for a pending HARQ retransmission can occur and there is data in the corresponding HARQ buffer; or
  a Beam Change Indication MAC-CE is received before the start of on-duration, until the onDurationTimer starts; or
  an UCI (Uplink Control Information) is sent and is pending; or
  a random access preamble is sent on xPRACH and is pending; or
  a SR preamble is sent on xPRACH and is pending; or
  a xPDCCH indicating a new transmission addressed to the C-RNTI of the 5G-MAC entity has not been received after successful reception of a Random Access Response for the preamble not selected by the 5G-MAC entity (as described in subclause 5.1.4).

When DRX is configured, the 5G-MAC entity shall for each subframe:
if a HARQ RTT Timer expires in this subframe and the data of the corresponding HARQ process was not successfully decoded:
  start the drx-RetransmissionTimer for the corresponding HARQ process.
if a DRX Command MAC control element or a Long DRX Command MAC control element is received:
  stop onDurationTimer;
  stop drx-InactivityTimer.

if drx-InactivityTimer expires or a DRX Command MAC control element is received in this subframe:
  if the Short DRX cycle is configured:
    start or restart drxShortCycleTimer;
    use the Short DRX Cycle.
  else:
    use the Long DRX cycle.
if drxShortCycleTimer expires in this subframe:
  use the Long DRX cycle.
if a Long DRX Command MAC control element is received:
  stop drxShortCycleTimer;
  use the Long DRX cycle.
If the Short DRX Cycle is used and [(SFN*50)+subframe number] modulo (shortDRX-Cycle)=(drxStartOffset) modulo (shortDRX-Cycle); or
if the Long DRX Cycle is used and [(SFN*50)+subframe number] modulo (longDRX-Cycle)=drxStartOffset:
  start onDurationTimer.
during the Active Time, for a subframe:
  monitor the xPDCCH;
  if the xPDCCH indicates a DL transmission:
    start the HARQ RTT Timer for the corresponding HARQ process;
    stop the drx-RetransmissionTimer for the corresponding HARQ process.
  if the xPDCCH does not indicate a scheduled data transmission (DL or UL):
    drx-InactivityTimer shall not be started
    the examples of xPDCCH which does not indicate a scheduled data transmission are;
      an UL DCI which triggers UCI transmission over xPUCCH or xPUSCH, or;
      any DCI formats which are not used for scheduling DL/UL data transmission.
  else if a xPDCCH indicates a new transmission (DL or UL):
    start or restart drx-InactivityTimer.
A UE may wake-up before an on-duration and perform beam management to find a suitable beam for communication as specified in subclause 5.5;
in current subframe n, if the 5G-MAC entity would not be in Active Time considering grants/assignments/DRX Command MAC control elements/Long DRX Command MAC control elements received and Scheduling Request sent until and including [subframe n−5] when evaluating all DRX Active Time conditions as specified in this subclause, CQI/PMI/RI on xPUCCH shall not be reported.
Regardless of whether the 5G-MAC entity is monitoring xPDCCH or not, the 5G-MAC entity receives and transmits HARQ feedback (ACK/NACK information) and transmits SRS when such is expected.
  NOTE: The same Active Time applies to all activated serving cell(s).
  NOTE: In case of downlink spatial multiplexing, if a TB is received while the HARQ RTT Timer is running and the previous transmission of the same TB was received at least N subframes before the current subframe (where N corresponds to the HARQ RTT Timer), the 5G-MAC entity should process it and restart the HARQ RTT Timer.
For each serving cell, the HARQ RTT Timer is set to l=n+4+k+m+3 subframes, where k∈{0, 1, . . . , 7} and m∈{0, 1, 2, 3} are within the DL DCI at subframe n for the interval between the downlink transmission and the transmission of associated HARQ feedback, as indicated in subclauses 8.5 of [5G.213].

Additional details can be found in TS 5G.211, "KT 5G Physical channels and modulation (Release 1)", TS 5G.212, "KT 5G Physical Layer Multiplexing and channel coding (Release 1)", TS 5G.213 TS 5G.213, "KT 5G Physical layer procedures (Release 1)", and TS 5G.321, "KT 5G MAC protocol specification (Release 1)".

Figure 14:
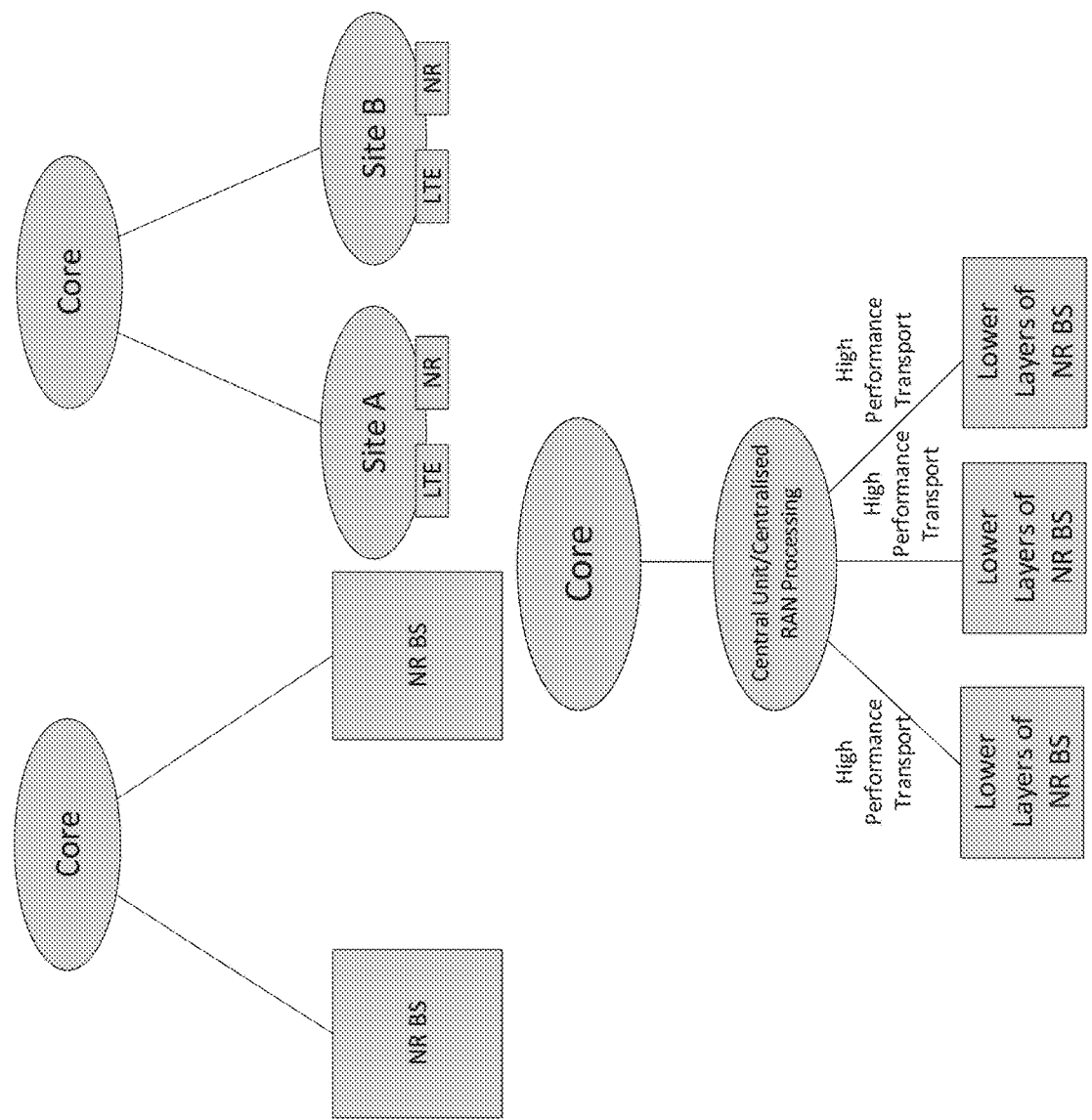
FIG. 14 is a diagram according to one exemplary embodiment.
Figure 15:
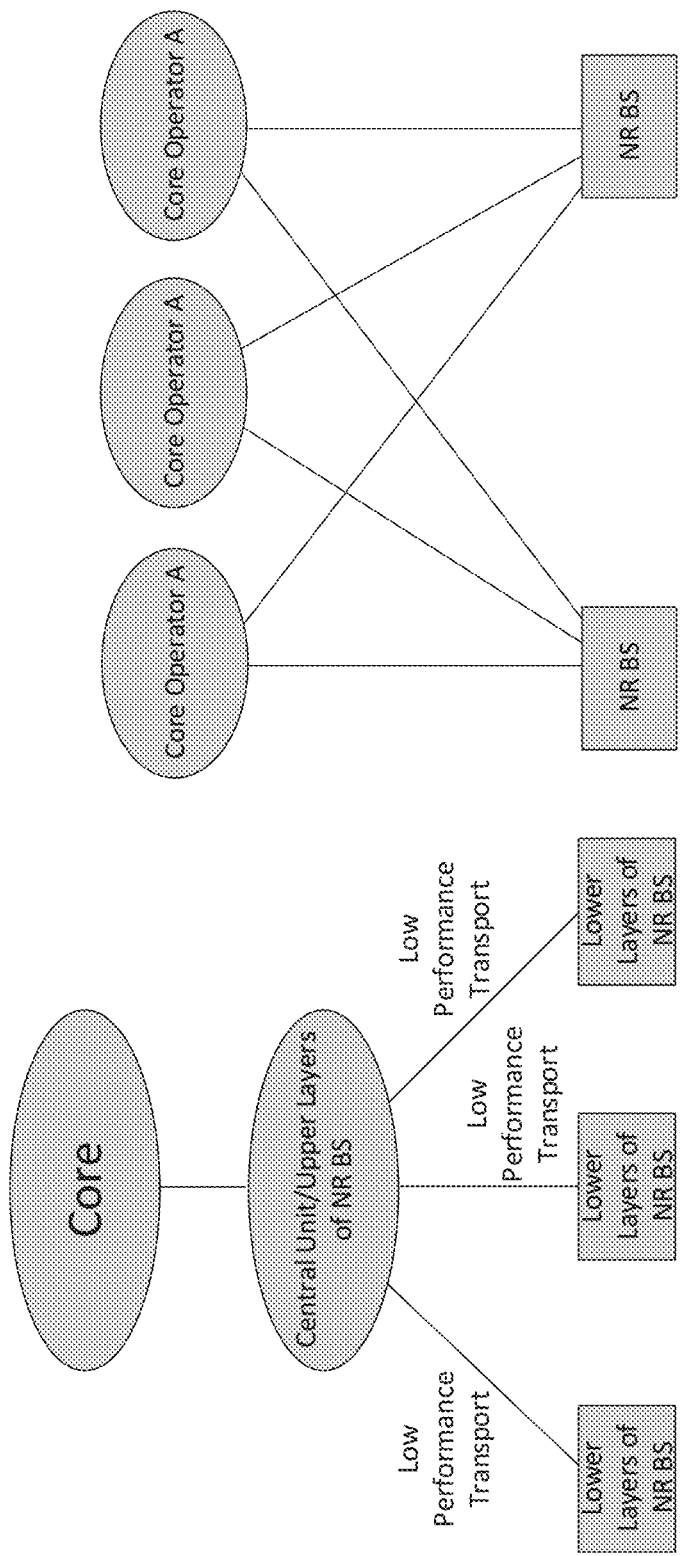
FIG. 15 is a diagram according to one exemplary embodiment.

As discussed in 3GPP R3-160947 and TR 38.801, the scenarios illustrated in FIGS. 14 and 15 could be considered for support by the NR radio network architecture. As discussed in 3GPP R2-164306, the following scenarios of cell layout for standalone NR are captured to be studied:
  Macro cell only deployment
  Heterogeneous deployment
  Small cell only deployment As discussed in 3GPP RAN2 #94 meeting minutes, 1 NR eNB corresponds to 1 or many TRPs. There are two potential levels of network controlled mobility as follows:
  RRC driven at "cell" level.
  Zero/Minimum RRC involvement (e.g. at MAC/PHY)

As discussed in 3GPP R2-162210, the following principles of 2-level mobility handling may possibly be kept in 5G:
A) Cell level mobility
  a. Cell selection/reselection in IDLE, handover in CONN
  b. Handled by RRC in CONN state
B) Beam level management
  a. L1 handles appropriate selection of the TRP to use for a UE and the optimal beam direction In general, 5G systems are expected to rely more heavily on "beam based mobility", in addition to regular handover based UE mobility, to handle UE mobility. Technologies like MIMO, fronthauling, C-RAN and NFV will allow the coverage area controlled by one "5G Node" to grow, thus increasing the possibilities for beam level management and reducing the need for cell level mobility. All mobility within the coverage area of one 5G node could in theory be handled based on beam level management, which would leave handovers only to be used for mobility to the coverage area of another 5G Node.

Figure 16:
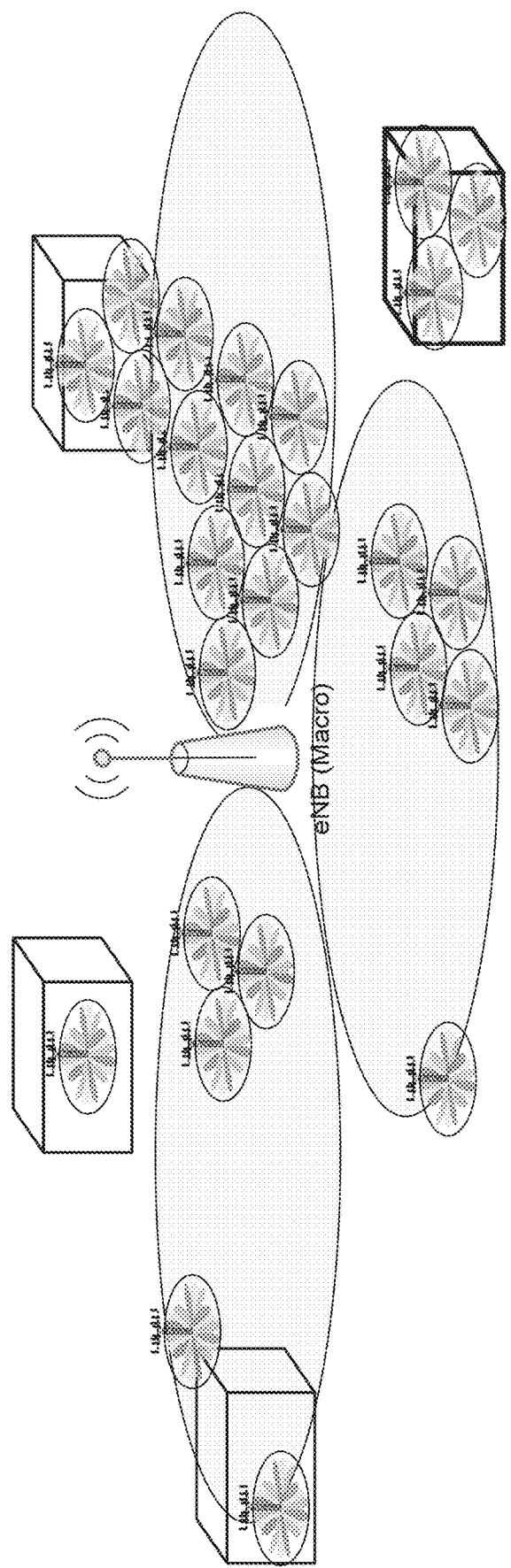
FIG. 16 is a reproduction of a portion of FIG. 1 of 3GPP R2-163879.
Figure 17:
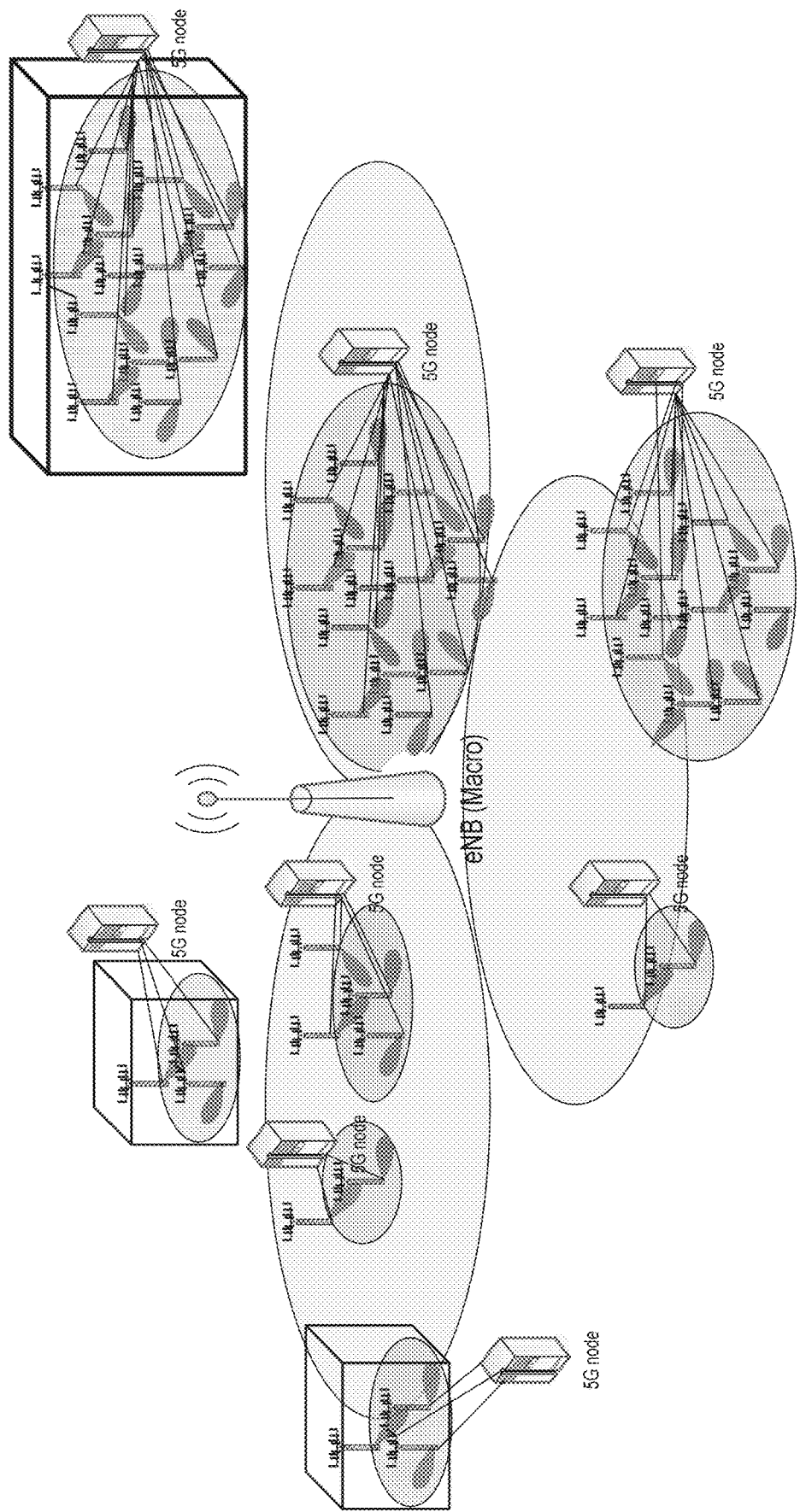
FIG. 17 is a reproduction of a portion of FIG. 1 of 3GPP R2-163879.
Figure 18:
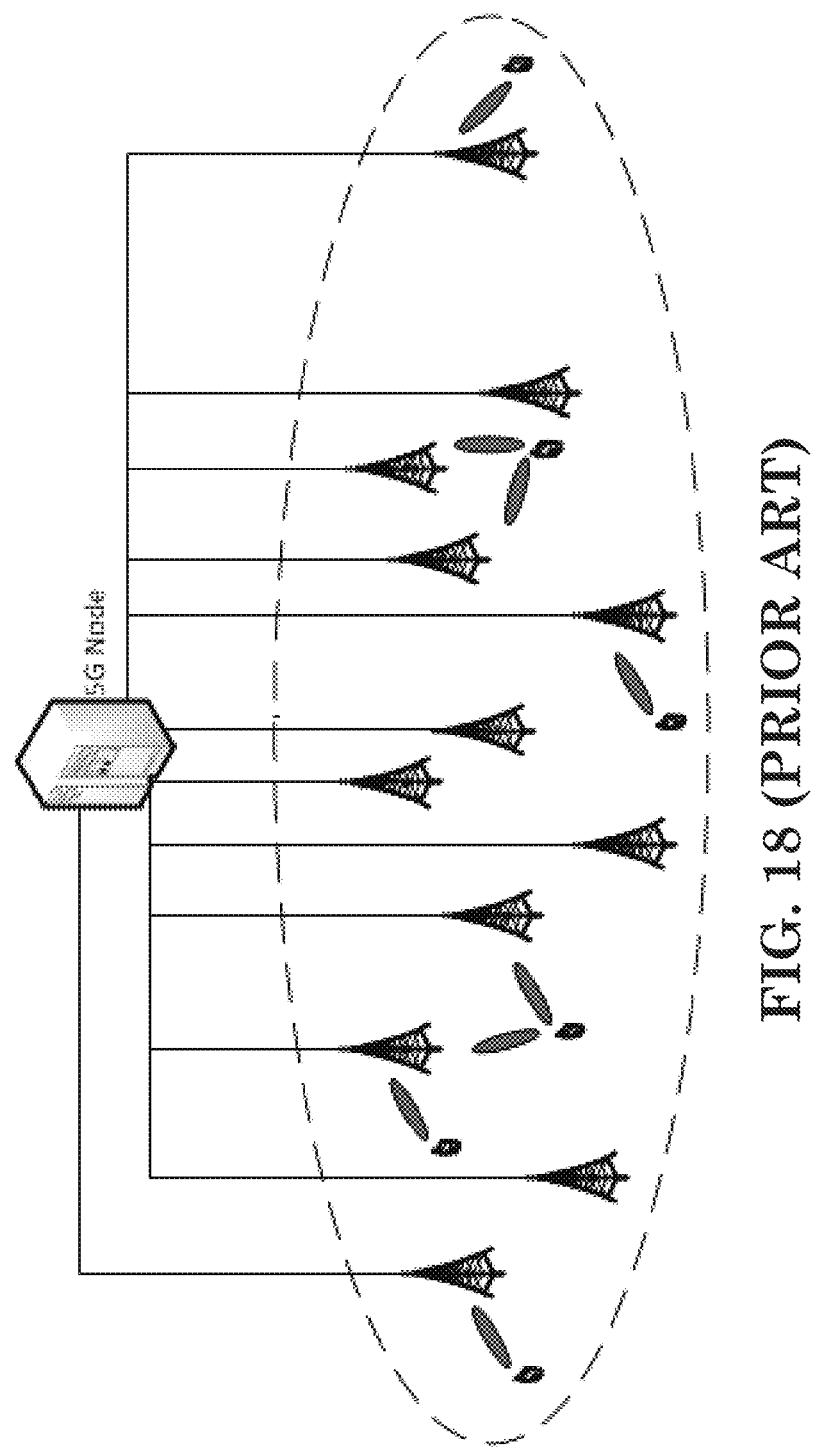
FIG. 18 is a reproduction of FIG. 3 of 3GPP R2-162210.
Figure 19:
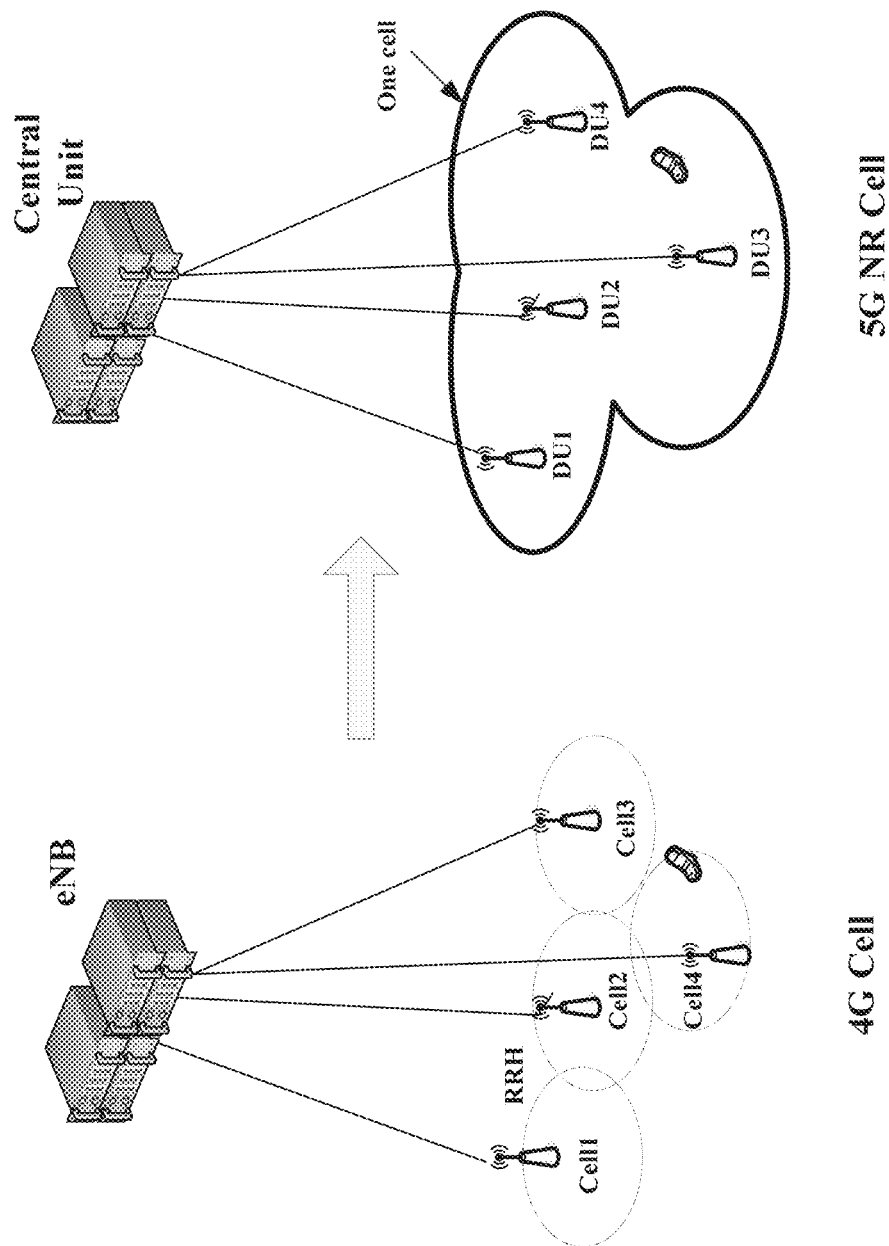
FIG. 19 is a reproduction of FIG. 1 of 3GPP R2-163471.

FIGS. 16 to 19 show examples of a cell in 5G NR. FIG. 16 is a reproduction of a portion of FIG. 1 of 3GPP R2-163879, and shows an exemplary deployment with single TRP cell. FIG. 17 is a reproduction of a portion of FIG. 1 of 3GPP R2-163879, and shows an exemplary deployment with multiple TRP cells. FIG. 18 is a reproduction of FIG. 3 of 3GPP R2-162210, and shows an exemplary 5G cell comprising a 5G node with multiple TRPs. FIG. 19 is a reproduction of FIG. 1 of 3GPP R2-163471, and shows a comparison between a LTE cell and a NR cell.

Apart from the handover based on RRM measurement, a 5G UE could adapt the serving beam to maintain 5G connectivity subject to beam quality fluctuation or UE intra-cell mobility. To do so, 5G Node-B and UE could track and change the serving beam properly (called beam tracking hereafter).

The following terminologies may be used hereafter:
  BS: a network central unit or a network node in NR which is used to control one or multiple TRPs which are associated with one or multiple cells. Communication between BS and TRP(s) is via fronthaul. BS could be referred to as central unit (CU), eNB, gNB, or NodeB.
  TRP: a transmission and reception point provides network coverage and directly communicates with UEs. TRP could be referred to as distributed unit (DU).
  Cell: a cell is composed of one or multiple associated TRPs, i.e., coverage of the cell is composed of coverage of all associated TRP(s). One cell is controlled by one BS. Cell could be referred to as TRP group (TRPG).

Beam sweeping: in order to cover all possible directions for transmission and/or reception, a number of beams is required. Since it is not possible to generate all these beams concurrently, beam sweeping means to generate a subset of these beams in one time interval and change generated beam(s) in other time interval(s), i.e., changing beam in time domain. So, all possible directions can be covered after several time intervals.

Beam sweeping number: necessary number of time interval(s) to sweep beams in all possible directions once for transmission and/or reception. In other words, a signaling applying beam sweeping would be transmitted "beam sweeping number" of times within one time period, e.g., the signaling is transmitted in (at least partially) different beam(s) in different times of the time period.

Serving beam: serving beam for a UE is a beam generated by network, e.g. TRP, which is currently used to communicate with the UE, e.g. for transmission and/or reception.

Candidate beam: candidate beam for a UE is a candidate of a serving beam. Serving beam may or may not be candidate beam.

Qualified beam: qualified beam is a beam with radio quality, based on measuring signal on the beam, better than a threshold.

The following assumptions for network side may be adopted hereafter:

NR using beamforming could be standalone, i.e., UE can directly camp on or connect to NR.

NR using beamforming and NR not using beamforming could coexist, e.g., in different cells.

TRP could apply beamforming to both data and control signaling transmissions and receptions, if possible and beneficial.

Number of beams generated concurrently by TRP depends on TRP capability, e.g., maximum number of beams generated concurrently by different TRPs may be different.

Beam sweeping is necessary, e.g., for the control signaling to be provided in every direction.

Figure 20:
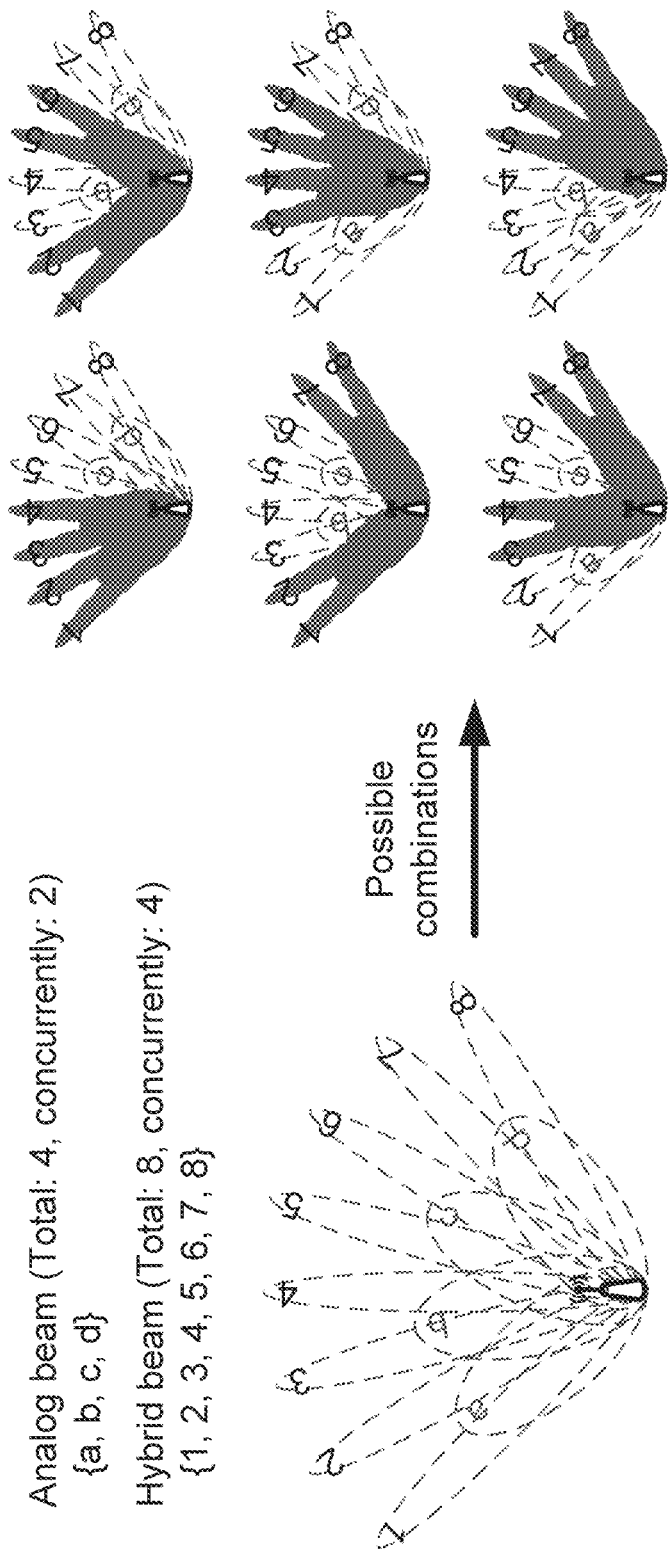
FIG. 20 is a diagram according to one exemplary embodiment.

(For hybrid beamforming) TRP may not support all beam combinations, e.g. some beams could not be generated concurrently. FIG. 20 shows an example for combination limitation of beam generation.

Downlink timing of TRPs in the same cell are synchronized.

RRC layer of network side is in BS.

TRP could support both UEs with UE beamforming and UEs without UE beamforming, e.g., due to different UE capabilities or UE releases.

The following assumptions for UE side may be adopted hereafter:

UE may perform beamforming for reception and/or transmission, if possible and beneficial.

Number of beams generated concurrently by UE depends on UE capability, e.g., generating more than one beam is possible.

Beam(s) generated by UE is wider than beam(s) generated by eNB.

Beam sweeping for transmission and/or reception is generally not necessary for user data but may be necessary for other signaling, e.g. to perform measurement.

(For hybrid beamforming) UE may not support all beam combinations, e.g., some beams could not be generated concurrently. FIG. 20 shows an example for combination limitation of beam generation.

Not every UE supports UE beamforming, e.g., due to UE capability or UE beamforming is not supported in NR first (few) release(s).

One UE is possible to generate multiple UE beams concurrently and to be served by multiple serving beams from one or multiple TRPs of the same cell.

Same or different (DL or UL) data could be transmitted on the same radio resource via different beams for diversity or throughput gain.

There are at least two UE (RRC) states: connected state (or called active state) and non-connected state (or called idle state). Inactive state may be an additional state or belong to connected state or non-connected state.

Figure 21:
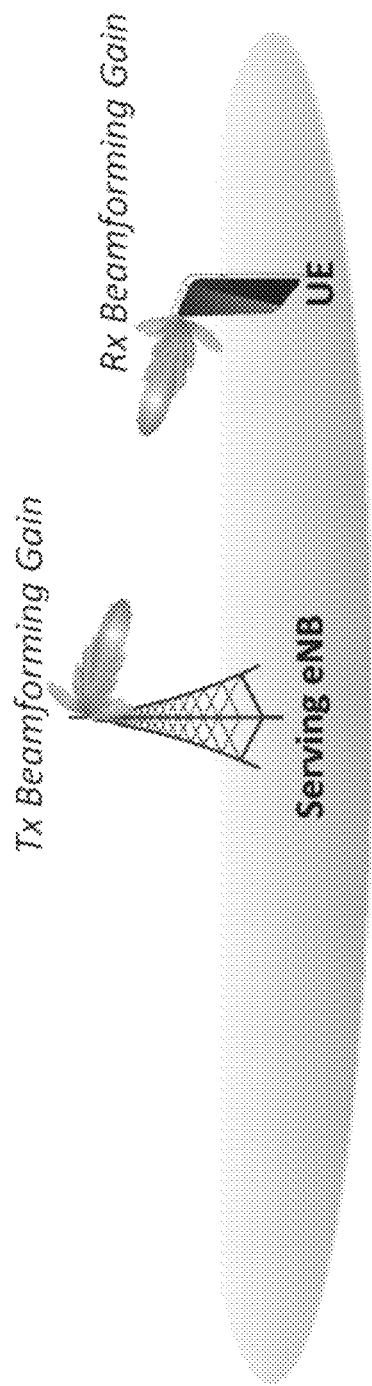
FIG. 21 is a reproduction of FIG. 3 of 3GPP R2-162251.

As discussed in 3GPP R2-162251, to use beamforming in both eNB and UE sides, practically, antenna gain by beamforming in eNB is considered about 15 to 30 dBi and the antenna gain of UE is considered about 3 to 20 dBi. FIG. 21, which is a reproduction of FIG. 3 of 3GPP R2-162251, illustrates gain compensation by beamforming.

Figure 22:
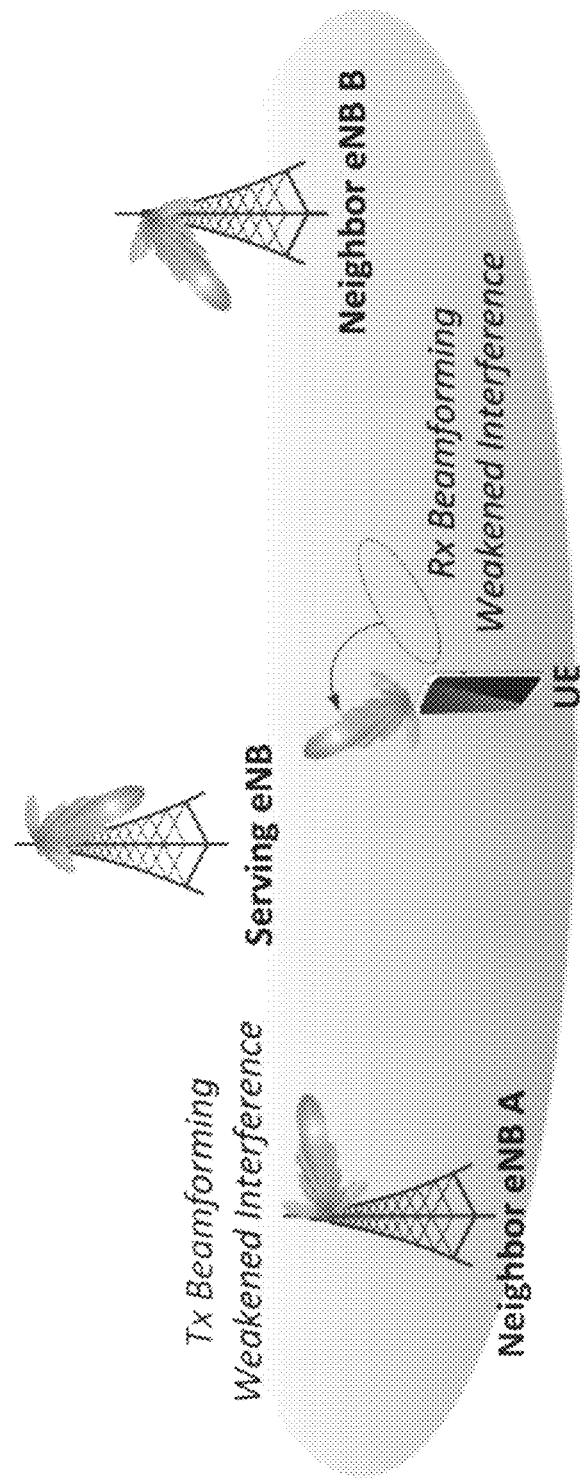
FIG. 22 is a reproduction of FIG. 4 of 3GPP R2-162251.

From SINR perspective, sharp beamforming reduces interference power from neighbor interferers, i.e., neighbor eNBs in downlink case or other UEs connected to neighbor eNBs. In TX beamforming case, only interference from other TXs whose current beam points the same direction to the RX will be the "effective" interference. The "effective" interference means that the interference power is higher than the effective noise power. In RX beamforming case, only interference from other TXs whose beam direction is the same to the UE's current RX beam direction will be the effective interference. FIG. 22, which is a reproduction of FIG. 4 of 3GPP R2-162251, illustrates weakened interference by beamforming.

When the UE is in connected state, the UE may move among different beams or TRPs of the same serving cell. Besides, if UE beamforming is used, UE beam(s) may also change over time, e.g., due to UE rotation.

An exemplary case of mobility in connected state without cell change has the following steps:

Signaling for Change Detection

Change of UE beam(s), serving beam(s) of serving TRP (s), and serving TRP(s) may be detected by a UE and/or a network node. In order to detect the change, a signaling periodically transmitted by TRP(s) or the UE could be used. TRP(s) periodically performs beam sweeping for reception or transmission of the signaling. If UE beamforming is used, the UE periodically performs beam sweeping for reception or transmission of the signaling.

UE Beam Change

If the change is detected by the UE, the UE itself may select proper UE beam(s) for the following reception (and transmission, e.g., for TDD). Alternatively, the UE needs to provide feedback to the network node and the network node could provide an indication of UE beam change from the network node to the UE.

If the change is detected by the network node, indication of UE beam change from the network node to the UE may be required. The UE uses UE beam(s) indicated by the network node for the following transmission (and reception, e.g., for TDD).

Serving Beam and/or Serving TRP Change

After the UE receives the signaling for change detection, the UE needs to provide feedback to the network node and the network node could decide whether to change (DL) serving beam(s) and/or serving TRP(s) for the UE. On the other hand, after TRP(s) receives the signaling for change detection, the network node could decide whether to change serving beam(s) and/or serving TRP(s) for the UE.

Figure 23:
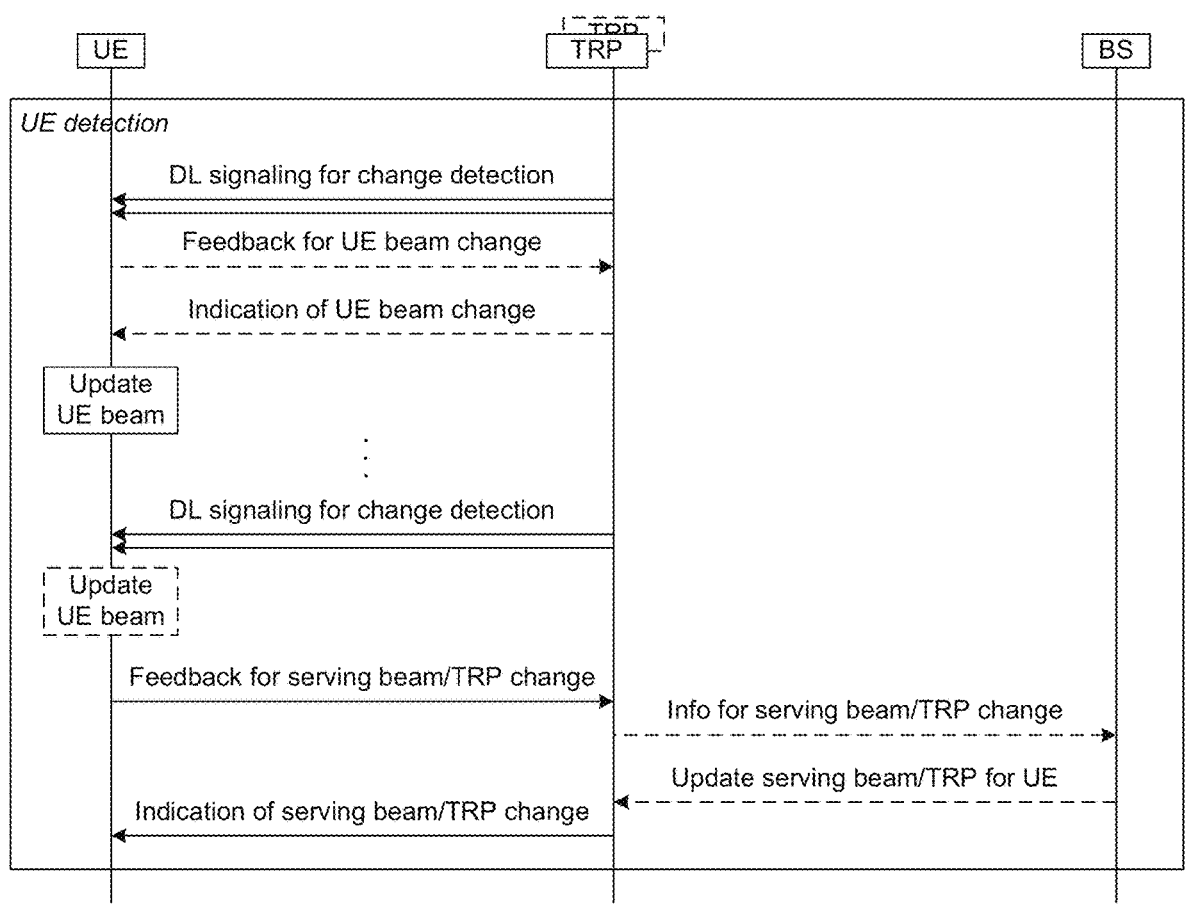
FIG. 23 is a flow chart according to one exemplary embodiment.
Figure 24:
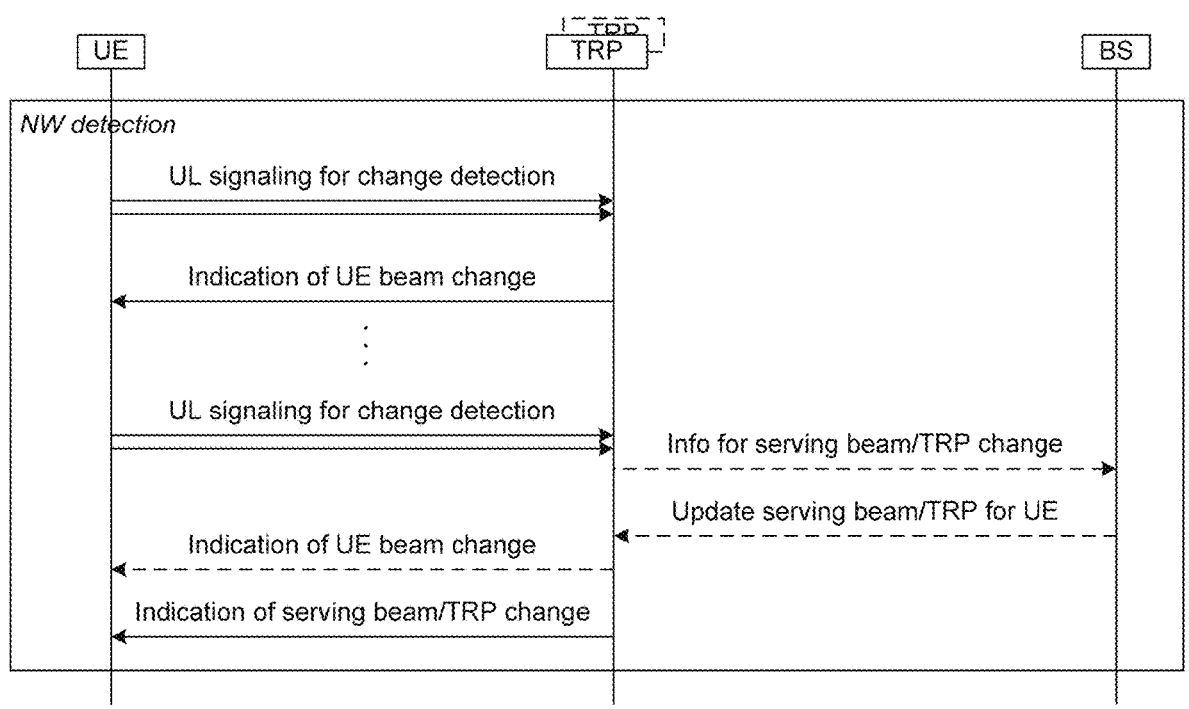
FIG. 24 is a flow chart according to one exemplary embodiment.

FIGS. 23 and 24 illustrate exemplary flow charts for mobility in connected state without cell change.

In NR, a new state (e.g., inactive state) is considered in addition to RRC connected state and RRC idle state that already exist in LTE. The new state may be a sub-state of RRC connected state, a sub-state of RRC idle state, or an independent state that does not belong to connected state or idle state. The new state may be referred as inactive state, connected inactive state, RAN controlled state. The characteristics of the new state are described in 3GPP R2-168856 as follows:

5.5.2 UE States and State Transitions

RRC supports the following three states which can be characterized as follows:

RRC_IDLE:
   Cell re-selection mobility;
   [FFS: The UE AS context is not stored in any gNB or in the UE;]
   Paging is initiated by CN;
   Paging area is managed by CN.
RRC_INACTIVE:
   Cell re-selection mobility;
   CN-NR RAN connection (both C/U-planes) has been established for UE;
   The UE AS context is stored in at least one gNB and the UE;
   Notification is initiated by NR RAN;
   RAN-based notification area is managed by NR RAN;
   NR RAN knows the RAN-based notification area which the UE belongs to;
RRC_CONNECTED:
   The UE has an NR RRC connection;
   The UE has an AS context in NR;
   NR RAN knows the cell which the UE belongs to;
   Transfer of unicast data to/from the UE;
   Network controlled mobility, i.e. handover within NR and to/from E-UTRAN.

In addition, the following principles for the new state are also specified in 3GPP R2-168856:

UEs in RAN controlled state should incur minimum signalling, minimise power consumption, minimise resource costs in the RAN/CN making it possible to maximise the number of UEs utilising (and benefiting from) this state.

UEs in RAN controlled state should be able to start data transfer with low delay (as required by RAN requirements).

For the UE in the "new state", a RAN initiated notification procedure should be used to reach UE. And the notification related parameters should be configured by RAN itself.

For the UE in the "new state", RAN should be aware whenever the UE moves from one "RAN-based notification area" to another.

In the 'new state' there will be a mechanism where the UE first transits to the full connected state where data transmission can occur.

The possibility will be studied for the UE to perform data transmission without state transition from the 'new state' to be fully connected.

In the RRC_INACTIVE state, a UE location can be known at the RAN based area level where that area may be a single cell or more than one cell. Area is determined by the network.

It is assumed that UE performs CN level location update when crossing a TA boundary when in inactive (in addition to RAN updates based on RAN areas).

There will be NG Core/CN Location Area code (similar to Tracking Area code) broadcast in system information of an NR Cell.

RAN based notification area is UE-specific and configurable by the gNB via dedicated signalling.

There will be a unique global Cell ID broadcast in system information of NR Cell.

For the inactive state there will be a way to configure the UE with a RAN based notification area that is smaller than a TA (tracking area).

A RAN notification area can cover a single cell or multiple cells.

A UE in the NR RRC_INACTIVE state can perform re-selection to another RAT (at least in some cases (GERAN, UTRAN, legacy LTE connected to EPC) the UE enters the IDLE state in that RAT). FFS target state in the case that LTE is connected to NG Core.

A UE could perform beam management to maintain at least one (network node) beam that is usable for transmission and/or reception, e.g., serving beam. The beam management may comprise but is not limited to the following procedures discussed in 3GPP TS 5G.321:
   Beam feedback procedure;
   Beam change procedure; and
   Beam adjustment request procedure.

In addition, a UE could perform DRX to control the DL control channel (e.g., PDCCH) monitoring so that UE battery consumption can be reduced. DRX active time is specified in 3GPP TS 36.321, TS 36.300, and TS 5G.321, "KT 5G MAC protocol specification (Release 1)". When DRX is configured, the time other than DRX active time may be referred to as DRX inactive time. Based on KT 5G MAC specification TS 5G.321, "KT 5G MAC protocol specification (Release 1)", beam management may be continued during DRX inactive time. Beam management requires continuous BRS (Beam Reference Signal) measurement that consumes UE power. Moreover, according to TS 5G.321, "KT 5G MAC protocol specification (Release 1)", a UE needs to initiate a random access procedure for BSI reporting when uplink is not synchronized (i.e. time alignment timer is not running). Therefore, it may not always be beneficial to continue beam management during DRX inactive time, e.g., for stationary UEs, UEs without traffic ongoing, or UEs without active service.

In general, to solve the issue, a UE (e.g., in connected state) could stop beam management during DRX inactive time. For example, the UE does not perform BRS measurement and BSI reporting during DRX inactive time. However, continuing beam management during DRX inactive time may have the benefit of reduced latency for the following data transfer since the UE knows which beam to use when there is a need for data transfer. This may be helpful for services with sensitive latency requirement. As a compromise, whether to continue beam management during DRX inactive time could be configured or controlled by the network node. The network node (e.g., gNB) could configure or control it based on the QoS of the current active service of the UE. Alternatively, whether to perform beam management is at least based on UL synchronization state. For example, the UE could stop performing beam management when the UL becomes not synchronized.

Similar issues may also occur for the UE in inactive state. Based on the same reason discussed above, it may not always be beneficial to continue beam management during inactive state. To solve the issue, the above method could apply to the case when the UE is in inactive state. For example, a UE could stop beam management during (DRX inactive time in) inactive state. Alternatively, whether to continue beam management during (DRX inactive time in) inactive state could be configured or controlled by the network node.

As discussed above, beam management could be used to maintain the serving beam of a UE. Regarding beam management, after serving beam of a UE is determined, the UE should perform measurement on the serving beam to determine whether the current serving beam is valid or not. The measurement result may be reported to the network node. And the network node may change the serving beam based on the measurement result. In some cases (e.g., during DRX inactive time, during inactive state, or etc.), the beam management may not continue. During the time that beam management is not performed, the UE has no idea about whether the current serving beam is still valid or not. A method for the UE to determine whether the current serving beam is valid is considered below.

To solve the issue, a timer could be used to determine whether the current serving beam is valid or not. The timer may be called a serving beam validity timer. A UE may maintain a timer for the serving beam(s). The length of the timer may be configured by the network node. The length may be zero or infinity. Handling of the timer may comprise but is not limited to the following actions:

The timer could be started or restarted in response to determination or update of the serving beam(s). The serving beam(s) may be determined based on information from the network node, or determined by the UE and informing the network node.

The timer could be restarted in response to execution of beam tracking and/or beam measurement on the current serving beam(s) (and the current serving beam(s) still fulfills the criteria of being a serving beam (e.g., the quality is greater than a threshold or it is the best beam). The beam tracking and/or beam measurement may be performed periodically or triggered by the network node (e.g., xPDCCH order).

The timer could be restarted in response to reporting of a measurement result of the current serving beam(s) to the network node (and the current serving beam(s) still fulfills the criteria of being a serving beam e.g. the quality is greater than a threshold or it is the best beam). The reporting may be performed periodically or triggered by the network node. The reporting may be BRI report or BSI report, as discussed in TS 5G.213, "KT 5G Physical layer procedures (Release 1)" and 5G.321, "KT 5G MAC protocol specification (Release 1)".

The timer could be restarted in response to DL reception or UL transmission via the current serving beam(s).

The timer could be stopped, e.g., if the current serving beam(s) cannot be a serving beam anymore, if the criteria of being a serving beam is not fulfilled, or if UE enters inactive state.

When the timer expires or stops, the UE could consider the serving beam(s) as invalid.

When the timer expires or stops, the UE may not perform beam management.

When the timer is running, the UE could consider the current serving beam(s) as valid. The UE could use the serving beam(s) for data transmission and/or reception when there is a need for data transfer. When the timer is not running, the UE could consider the associated serving beam(s) as invalid, and may need to find at least a new serving beam first before data transmission and/or reception (when there is a need for data transfer).

In general, a UE could monitor DL control signaling on a DL control channel (e.g., PDCCH, xPDCCH) via the serving beam(s) of the UE. According to TS 5G.213, "KT 5G Physical layer procedures (Release 1)", a UE could assume that xPDCCH, xPDSCH, CSI-RS, xPUCCH, xPUSCH, and xSRS is transmitted and/or received via the serving beam of the UE. If the serving beam(s) of the UE is considered as invalid or if the UE does not have any valid serving beam, it is not clear which beam the UE monitors a DL control channel (e.g., xPDCCH).

If the UE does not have any valid serving beam, the UE could monitor a DL control channel via the best beam of the UE. The UE may find the best beam by measuring BRS. The best beam may be a beam with highest RSRP (Reference Signal Receiving Power). The network node may need to sweep beams for transmitting the DL control channel to make sure the UE can receive it if there is no valid serving beam.

The UE may monitor a DL control channel at multiple timings corresponding to different beams of a network node. The multiple timings may cover all beams of the network node.

The UE may monitor the DL control channel to receive a signaling for indicating a new serving beam, or a signaling for initiating a procedure for finding a suitable beam to be a serving beam (e.g., BSI reporting or BRI reporting).

When a UE has uplink data available for transmission, the UE may need to request some uplink resource to transmit the data, e.g. via a scheduling request as discussed in 3GPP TS 36.321. For the case that the serving cell of the UE is using beamforming, the UE could maintain at least one serving beam that can be used for data transmission and/or reception. When the current serving beam is valid (e.g., during DRX active time or when the serving beam validity timer is running), the UE could initiate a normal scheduling request procedure via the serving beam(s). However, in some cases the UE may not have any valid serving beam when the UE has a need for uplink data transfer. For example, uplink data is available for transmission during DRX inactive time if beam management does not continue during DRX inactive time or when the serving beam validity timer is not running. Beam management (e.g., beam feedback) may be stopped during a time period within DRX inactive time. As mentioned above, the UE may consider the serving beam as invalid, and the normal scheduling request procedure cannot be used since no valid serving beam can be used. Handling of uplink data arrival when the UE has no valid serving beam is considered below.

To solve the issue, when a UE has uplink data available for transmission but does not have any valid serving beam (e.g., uplink data is available for transmission during the time period where beam management is stopped), the UE could find at least a specific beam in order to transmit a request to acquire UL resources. The UE may be UL synchronized. The UE may find the specific beam by measuring BRS. The specific beam may be a best beam among beams measured by the UE. The best beam may be a beam with highest RSRP. The beams may belong to the same cell, e.g., serving cell of the UE. The request may be transmitted via the specific beam. The request may be a scheduling request. The request may be a scheduling request preamble, a BSI report, or a BRI report as discussed in TS 5G.213, "KT 5G Physical layer procedures (Release 1)" and 5G.321, "KT 5G MAC protocol specification (Release 1)". After transmitting the request, the UE could monitor a response of the request via the specific beam. The network node may transmit the response via the specific beam. The response may be a random access response. The response may be a beam update command or may notify the UE to report BSI or BRI so that the network node can determine the new serving beam(s) for the UE. The response may include an uplink grant.

The UE may just transmit the request at multiple timings corresponding to different beams of the network node to make sure the network node can receive the request. The multiple timings cover all beams of the network node. The UE could monitor a response of the request via the specific beam. The network node may transmit the response via the specific beam.

Instead of finding a specific beam for transmitting the request to trigger new serving beam determination, the UE could initiate a random access procedure as specified in TS 5G.213, "KT 5G Physical layer procedures (Release 1)", during which the serving beam(s) can be determined.

When the network node has downlink data to be transmitted to a UE, the network node may transmit a downlink assignment to the UE via a serving beam of the UE. The UE could perform DL data reception based on the downlink assignment. The downlink assignment could be transmitted to the UE during DRX active time when the UE is UL synchronized.

For the case that the serving cell of the UE is using beamforming, the UE could maintain at least one serving beam that can be used for data transmission and/or reception. In some cases, the UE may not have a valid serving beam when the network node has downlink data to be transmitted to the UE. For example, beam management may not be continued when the UE does not have UL synchronized, when the UE is in DRX inactive time, or when the UE is in inactive state. In such cases, downlink assignment cannot be transmitted to the UE via the serving beam of the UE. Handling of downlink data arrival when the UE has no valid serving beam or when the serving beam validity timer is not running is considered below.

To solve the issue, if a UE has no valid serving beam, the UL of the UE is not synchronized, and the network node has downlink data to be transmitted to the UE, the network node could transmit a request for UL transmission to the UE (e.g., using beam sweeping). The request may be a request for a scheduling request preamble, a request for initiating a random access procedure, a request for a BSI report, or a request for a BRI report as discussed in TS 5G.213, "KT 5G Physical layer procedures (Release 1)" and 5G.321, "KT 5G MAC protocol specification (Release 1)". The UE may monitor the request via a specific beam. The specific beam may be determined by measuring BRS. The specific beam may also be a best beam among beams measured by the UE. The best beam may be a beam with highest RSRP. The beams may belong to the same cell (e.g., serving cell of the UE).

The UE may determine the specific beam and/or monitor the request via the specific beam in at least one of the following timing: during or about to enter DRX active time (e.g., on-duration), when the UE needs to monitor a physical layer signaling (e.g., downlink assignment) on a physical downlink control channel (e.g., PDCCH), or when the UE leaves a period (e.g., DRX inactive time) where beam feedback is not performed. The PDCCH may be addressed to a C-RNTI of the UE or a P-RNTI (i.e. an RNTI for paging reception). After reception of a PDCCH addressed to the P-RNTI, the UE further receives a paging message on a PDSCH associated with the PDCCH, wherein the paging message includes information indicating downlink data arrival.

Instead of finding a specific beam for monitoring the request, the UE may monitor to receive the request at multiple timings corresponding to different beams of the network node to make sure the UE can receive the request. The multiple timings could cover all beams of the network node.

In response to the request, the UE may transmit a scheduling request preamble, a BSI report, or a BRI report, as discussed in TS 5G.213, "KT 5G Physical layer procedures (Release 1)" and 5G.321, "KT 5G MAC protocol specification (Release 1)", at the timing corresponding to the beam on which the request is received. The network node may receive the response using beam sweeping.

According to 3GPP TS 36.213, if a UE detects the current serving beam is misaligned and has BSIs for beam recovery, the UE could perform beam recovery process. Beam recovery procedure for a UL synchronized UE (e.g., time alignment timer is running or the UE has valid TA (Timing Advance)) may comprise the following steps:

The UE transmits a scheduling request preamble to notify a network node (e.g., gNB).

The network node transmits a DL control signaling (e.g., xPDCCH order) for initiating a BSI reporting procedure.

The UE reports BSI for the network node to select a serving beam.

In addition, according to TS 5G.213, "KT 5G Physical layer procedures (Release 1)", a UE assumes that xPDCCH, xPDSCH, CSI-RS, xPUCCH, xPUSCH, and xSRS are transmitted and/or received via the serving beam of the UE. However, for the case of beam recovery, UL and/or DL transmission via the serving beam may not be delivered successfully since the current serving beam is misaligned. To solve the issue, the following aspects could be considered.

The UE may needs to transmit the scheduling request preamble at multiple timings corresponding to different beams of the network node to make sure the network node can receive the scheduling request preamble. The multiple timings could cover all beams of the network node. The network node may transmits the DL control signaling (e.g., xPDCCH order) via the beam on which the scheduling request preamble is received. The UE may report BSI via the beam on which the DL control signaling is received.

Figure 25:
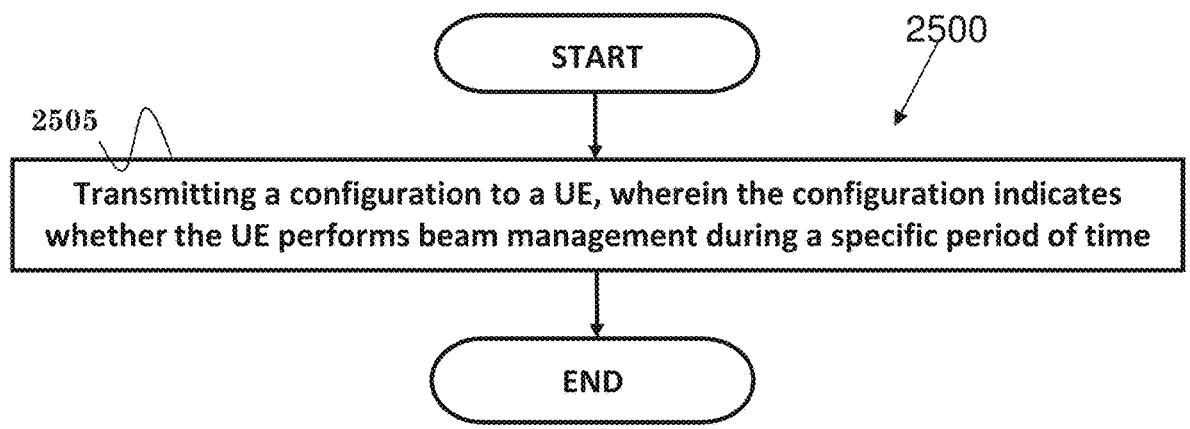
FIG. 25 is a flow chart according to one exemplary embodiment.

FIG. 25 is a flow chart 2500 according to one exemplary embodiment from the perspective of a network node. In step 2505, the network node transmits a configuration to a UE, wherein the configuration indicates whether the UE performs beam management during a specific period of time.

Referring back to FIGS. 3 and 4, in one exemplary embodiment of a network node, the device 300 includes a program code 312 stored in the memory 310. The CPU 308 could execute program code 312 to enable the network node to transmits a configuration to a UE, wherein the configuration indicates whether the UE performs beam management during a specific period of time. Furthermore, the CPU 308 can execute the program code 312 to perform all of the above-described actions and steps or others described herein.

Figure 26:
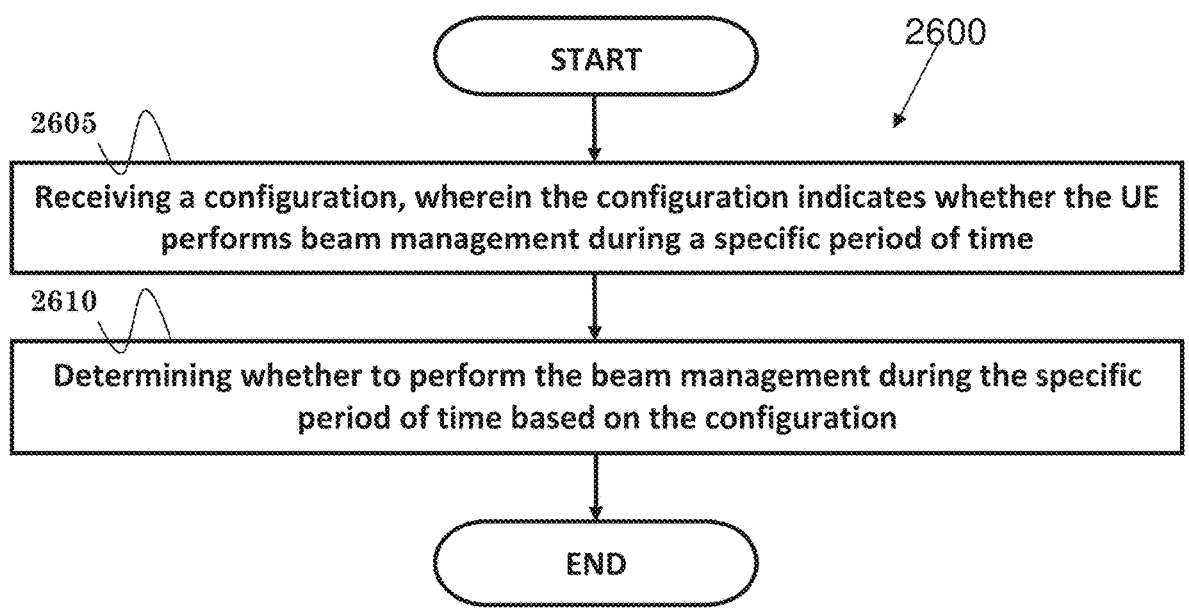
FIG. 26 is a flow chart according to one exemplary embodiment.

FIG. 26 is a flow chart 2600 according to one exemplary embodiment from the perspective of a UE. In step 2605, the UE receives a configuration, wherein the configuration indicates whether the UE performs beam management during a specific period of time. In step 2610, the UE determines whether to perform the beam management during the specific period of time based on the configuration.

Referring back to FIGS. 3 and 4, in one exemplary embodiment of a UE, the device 300 includes a program code 312 stored in the memory 310. The CPU 308 could execute program code 312 (i) to receive a configuration, wherein the configuration indicates whether the UE performs beam management during a specific period of time, and (ii) to determine whether to perform the beam management during the specific period of time based on the configuration. Furthermore, the CPU 308 can execute the program code 312 to perform all of the above-described actions and steps or others described herein.

In the context of the embodiments illustrated in FIGS. 25 and 26 and discussed above, the specific period of time could be DRX inactive time. Alternatively, the specific period of time could be the time duration when the UE is in inactive state.

In one embodiment, if the configuration indicates the UE to perform beam management during the specific period of time, the UE could perform beam management during the specific period of time. Alternatively, if the configuration indicates the UE not to perform beam management during the specific period of time, the UE does not perform beam management during the specific period of time.

In one embodiment, if the UE does not receive the configuration, the UE performs beam management during the period of time. Alternatively, if the UE does not receive the configuration, the UE does not perform beam management during the period of time.

Figure 27:
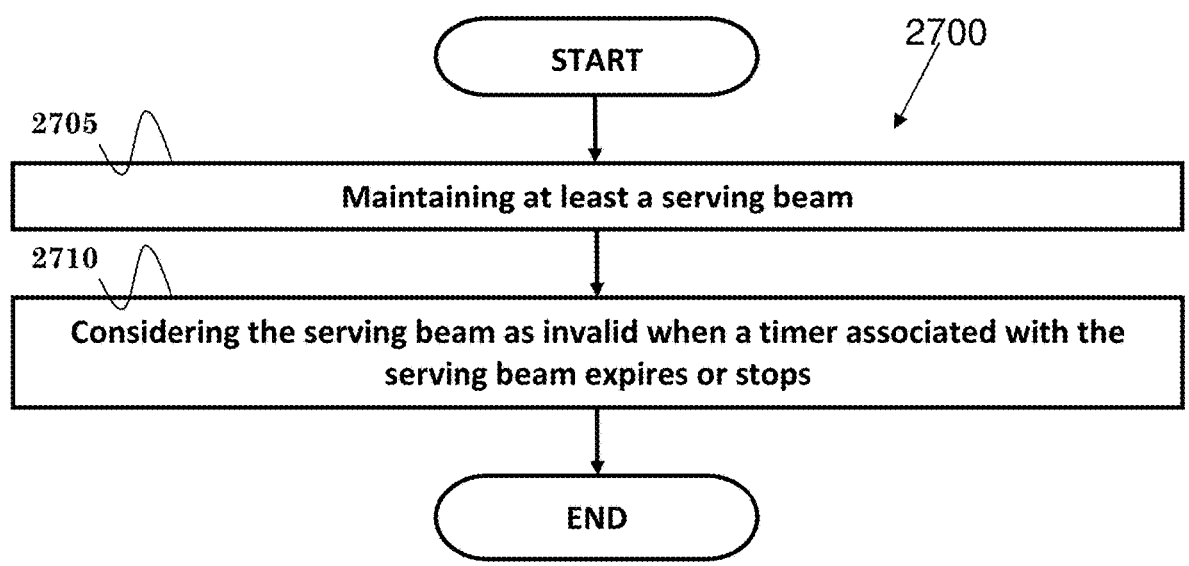
FIG. 27 is a flow chart according to one exemplary embodiment.

FIG. 27 is a flow chart 2700 according to one exemplary embodiment from the perspective of a UE. In step 2705, the UE maintains at least a serving beam. In step 2710, the UE considers the serving beam as invalid when a timer associated with the serving beam expires or stops.

In one embodiment, the timer could be associated with the serving beam of the UE. The serving beam could be considered as invalid when the timer expires. The timer could be started or restarted when the serving beam is determined or updated, when beam tracking or beam management is done, when beam measurement on a current serving beam is done, and/or when a measurement result is reported.

The measurement result could indicate the radio condition of a current serving beam. Alternatively, the measurement result could be a BRI report and/or a BSI report discussed in TS 5G.213, "KT 5G Physical layer procedures (Release 1)" and 5G.321, "KT 5G MAC protocol specification (Release 1)".

The timer could be stopped when the UE detects that the current serving beam does not fulfil the criteria of being a serving beam (e.g., radio quality is not good enough). The timer could be stopped when beam management is stopped.

The length of the timer could be configured by the network node. Alternatively, the length of the timer could be zero.

Referring back to FIGS. 3 and 4, in one exemplary embodiment of a UE, the device 300 includes a program code 312 stored in the memory 310. The CPU 308 could execute program code 312 (i) to maintain at least a serving beam, and (ii) to consider the serving beam as invalid when a timer associated with the serving beam expires or stops. Furthermore, the CPU 308 can execute the program code 312 to perform all of the above-described actions and steps or others described herein.

Figure 28:
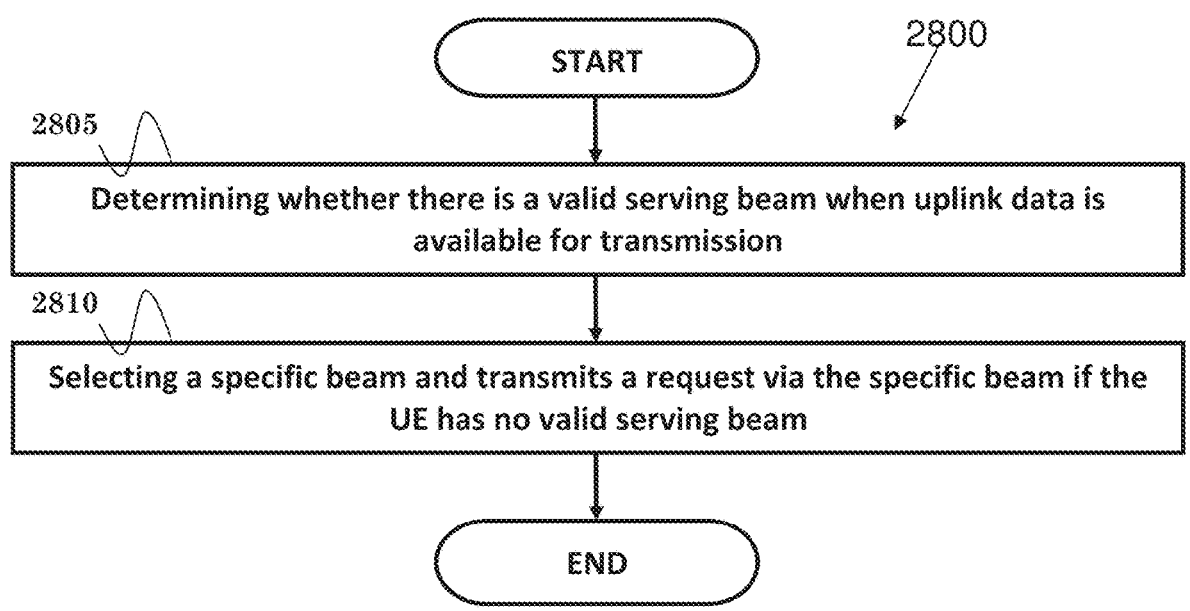
FIG. 28 is a flow chart according to one exemplary embodiment.

FIG. 28 is a flow chart 2800 according to one exemplary embodiment from the perspective of a UE. In step 2805, the UE determines whether there is a valid serving beam when uplink data is available for transmission. In step 2810, the UE selects a specific beam and transmits a request via the specific beam if the UE has no valid serving beam.

Referring back to FIGS. 3 and 4, in one exemplary embodiment of a UE, the device 300 includes a program code 312 stored in the memory 310. The CPU 308 could execute program code 312 (i) to determine whether there is a valid serving beam when uplink data is available for transmission, and (ii) to select a specific beam and to transmit a request via the specific beam if the UE has no valid serving beam. Furthermore, the CPU 308 can execute the program code 312 to perform all of the above-described actions and steps or others described herein.

Figure 29:
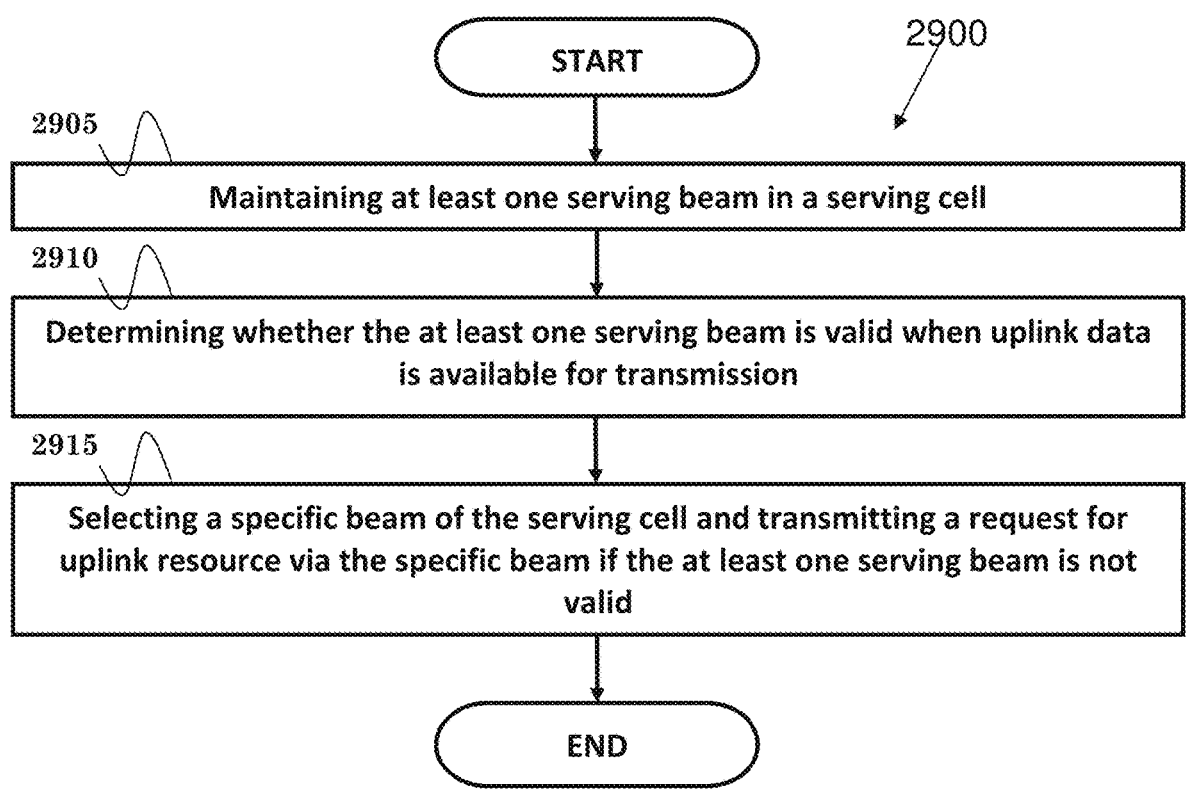
FIG. 29 is a flow chart according to one exemplary embodiment.

FIG. 29 is a flow chart 2900 according to one exemplary embodiment from the perspective of a UE. In step 2905, the UE maintains at least one serving beam in a serving cell. In step 2910, the UE determines whether the at least one serving beam is valid when uplink data is available for transmission. In step 2915, the UE selects a specific beam of the serving cell and transmits a request for uplink resource via the specific beam if the at least one serving beam is not valid.

Referring back to FIGS. 3 and 4, in one exemplary embodiment of a UE, the device 300 includes a program code 312 stored in the memory 310. The CPU 308 could execute program code 312 (i) to maintain at least one serving beam in a serving cell, (ii) to determine whether the at least one serving beam is valid when uplink data is available for transmission, and (iii) to select a specific beam of the serving cell and to transmit a request for uplink resource via the specific beam if the at least one serving beam is not valid. Furthermore, the CPU 308 can execute the program code 312 to perform all of the above-described actions and steps or others described herein.

In the context of the embodiments shown in FIGS. 28 and 29 and discussed above, the UE could select the specific beam based on BRS measurement. The specific beam could be the best beam measured by the UE. The best beam could be a beam with highest RSRP.

The request could be used to request uplink resources. The request could be a scheduling request, a random access preamble, a BSI report, or a BRI report. The UE could transmit the request via the at least one serving beam if the at least one serving beam is valid.

Figure 30:
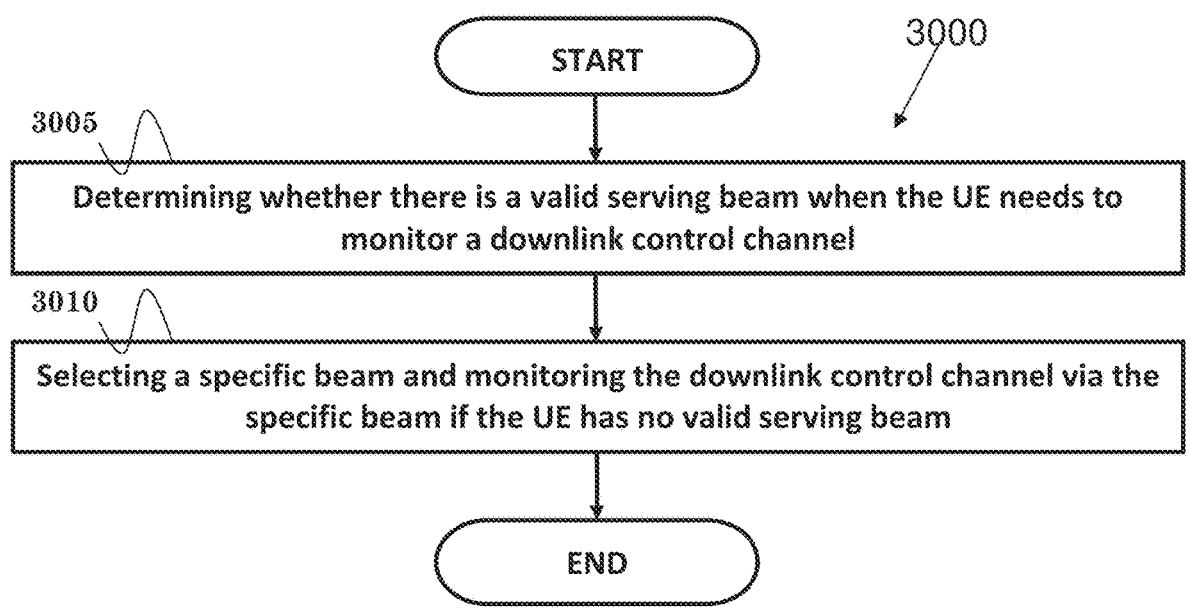
FIG. 30 is a flow chart according to one exemplary embodiment.

FIG. 30 is a flow chart 3000 according to one exemplary embodiment from the perspective of a UE. In step 3005, the UE determines whether there is a valid serving beam when the UE needs to monitor a downlink control channel. In step 3010, the UE selects a specific beam and monitors the downlink control channel via the specific beam if the UE has no valid serving beam.

Referring back to FIGS. 3 and 4, in one exemplary embodiment of a UE, the device 300 includes a program code 312 stored in the memory 310. The CPU 308 could execute program code 312 (i) to determine whether there is a valid serving beam when the UE needs to monitor a downlink control channel, and (ii) to select a specific beam and to monitor the downlink control channel via the specific beam if the UE has no valid serving beam. Furthermore, the CPU 308 can execute the program code 312 to perform all of the above-described actions and steps or others described herein.

Figure 31:
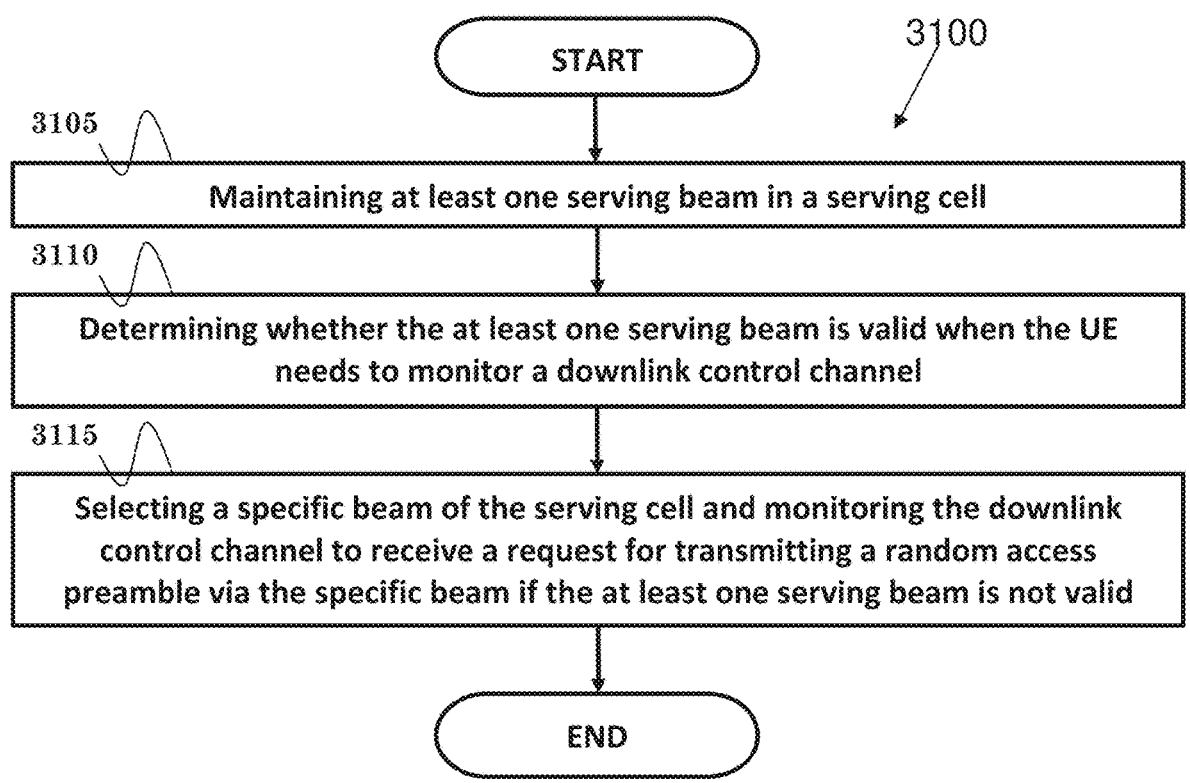
FIG. 31 is a flow chart according to one exemplary embodiment.

FIG. 31 is a flow chart 3100 according to one exemplary embodiment from the perspective of a UE. In step 3105, the UE maintains at least one serving beam in a serving cell. In step 3110, the UE determines whether the at least one serving beam is valid when the UE needs to monitor a downlink control channel. In step 3115, the UE selects a specific beam of the serving cell and monitors the downlink control channel to receive a request for transmitting a random access preamble via the specific beam if the at least one serving beam is not valid.

Referring back to FIGS. 3 and 4, in one exemplary embodiment of a UE, the device 300 includes a program code 312 stored in the memory 310. The CPU 308 could execute program code 312 (i) to maintain at least one serving beam in a serving cell, (ii) to determine whether the at least one serving beam is valid when the UE needs to monitor a downlink control channel, and (iii) to select a specific beam of the serving cell and to monitor the downlink control channel to receive a request for transmitting a random access preamble via the specific beam if the at least one serving beam is not valid. Furthermore, the CPU 308 can execute the program code 312 to perform all of the above-described actions and steps or others described herein.

In the context of the embodiments shown in FIGS. 28 and 29 and discussed above, the UE could select the specific beam based on BRS measurement. The specific beam could be the best beam measured by the UE. The best beam could be a beam with highest RSRP.

The uplink of the UE may be not synchronized. If the UE receives a request via the downlink control channel, the UE could transmit a response.

The response could be a random access preamble, a scheduling request preamble, a BSI report, or a BRI report.

The downlink control channel could be a physical downlink control channel (e.g., PDCCH). The UE could monitor the downlink control channel during DRX active time (e.g., on duration).

In the context of the embodiments illustrated in FIGS. 25-31 and discussed above, the beam management could include measuring the beams of a serving cell and neighbor cells. The beam management could include tracking whether the current serving beam is good enough and/or whether there is a need to change serving beam. The beam management could include a beam feedback procedure, a beam change procedure, and/or a beam adjustment request procedure. The network node could utilize beamforming for data transmission and/or reception.

In one embodiment, the UE could be in connected mode. The uplink timing could be synchronized for the UE. The timing alignment timer of the UE could be running.

In one embodiment, the UE could perform measurement on the at least one serving beam to determine whether the at least one serving beam is valid or not. The at least one serving beam could be invalid during DRX (Discontinuous Reception) inactive time if a beam feedback procedure is not continued during the DRX inactive time. The at least one serving beam could be invalid if a beam feedback procedure is not continued when uplink of the UE is not synchronized. In one embodiment, a timer could be used to determine whether the at least one serving beam is valid or not.

In one embodiment, the UE could transmit the random access preamble in response to the request.

Based on the invention, efficiency could be improved since beam management doesn't need to continue during a specific period of time. In addition, the side effects of not continuing beam management, e.g. serving beam becoming invalid, could be well handled.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of a UE (User Equipment), comprising:
maintaining at least one serving beam in a serving cell;
determining, during a Discontinuous Reception (DRX) inactive time, whether the at least one serving beam is valid when uplink data is available for transmission, wherein the DRX inactive time is a time other than a DRX active time when DRX is configured and the DRX active time includes a time while an on-duration timer is running, and wherein a beam feedback procedure is not performed during the DRX inactive time; and
responsive to determining that the at least one serving beam is not valid during the DRX inactive time:
selecting, by the UE, a specific beam of the serving cell and transmitting a request for uplink resource via the specific beam during the DRX inactive time.

2. The method of claim 1, wherein the UE selects the specific beam, based on beam reference signal measurement.

3. The method of claim 1, wherein the beam feedback procedure is used to report beam measurement result to the serving cell.

4. The method of claim 1, wherein the request is a random access preamble.

5. The method of claim 1, wherein the UE performs measurement on the at least one serving beam to determine whether the at least one serving beam is valid or not.

6. The method of claim 1, wherein the DRX active time includes at least one of:
the time while a DRX inactivity timer or a DRX retransmission timer or a Medium Access Control (MAC) contention resolution timer is running,
the time while a scheduling request is sent on Physical Uplink Control Channel (PUCCH) and is pending, or
the time while a Physical Downlink Control Channel (PDCCH) indicating a new transmission addressed to Cell Radio Network Temporary Identifier (C-RNTI) of a MAC entity has not been received after successful reception of a Random Access Response for a preamble not selected by the MAC entity.

7. The method of claim 1, wherein the UE transmits the request via the at least one serving beam if the at least one serving beam is valid.

8. A User Equipment (UE), comprising:
a control circuit;
a processor installed in the control circuit; and
a memory installed in the control circuit and operatively coupled to the processor;
wherein the processor is configured to execute a program code stored in the memory to:
maintain at least one serving beam in a serving cell;
determine, during a Discontinuous Reception (DRX) inactive time, whether the at least one serving beam is valid when uplink data is available for transmission, wherein the DRX inactive time is a time other than a DRX active time when DRX is configured and the DRX active time includes a time while an on-duration timer is running, and wherein a beam feedback procedure is not performed during the DRX inactive time; and
responsive to determining that the at least one serving beam is not valid during the DRX inactive time:
select a specific beam of the serving cell and transmit a request for uplink resource via the specific beam during the DRX inactive time.

9. The UE of claim 8, wherein the UE selects the specific beam based on beam reference signal measurement.

10. The UE of claim 8, wherein the beam feedback procedure is used to report beam measurement result to the serving cell.

11. The UE of claim 8, wherein the request is a random access preamble.

12. The UE of claim 8, wherein the UE performs measurement on the at least one serving beam to determine whether the at least one serving beam is valid or not.

13. The UE of claim 8, wherein the DRX active time includes at least one of:
the time while a DRX inactivity timer or a DRX retransmission timer or a Medium Access Control (MAC) contention resolution timer is running,
the time while a scheduling request is sent on Physical Uplink Control Channel (PUCCH) and is pending, or
the time while a Physical Downlink Control Channel (PDCCH) indicating a new transmission addressed to Cell Radio Network Temporary Identifier (C-RNTI) of a MAC entity has not been received after successful reception of a Random Access Response for a preamble not selected by the MAC entity.

14. The UE of claim 8, wherein the UE transmits the request via the at least one serving beam if the at least one serving beam is valid.

* * * * *